(12) United States Patent
Sekiguchi et al.

(10) Patent No.: US 8,369,404 B2
(45) Date of Patent: Feb. 5, 2013

(54) MOVING IMAGE DECODING DEVICE AND MOVING IMAGE DECODING METHOD

(75) Inventors: Shunichi Sekiguchi, Tokyo (JP); Yoshimi Moriya, Tokyo (JP); Kazuo Sugimoto, Tokyo (JP); Yoshihisa Yamada, Tokyo (JP); Kohtaro Asai, Tokyo (JP); Tokumichi Murakami, Tokyo (JP); Yuichi Idehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1399 days.

(21) Appl. No.: 11/925,248

(22) Filed: Oct. 26, 2007

(65) Prior Publication Data
US 2008/0170615 A1    Jul. 17, 2008

(30) Foreign Application Priority Data
Jan. 12, 2007    (JP) ................................. 2007-004651

(51) Int. Cl.
  *H04B 1/66*    (2006.01)
(52) U.S. Cl. ......... 375/240.14; 375/240.25; 375/240.12; 375/240.26
(58) Field of Classification Search ............. 375/240.25, 375/240.12, 240.26
See application file for complete search history.

(56) References Cited

U.S. PATENT DOCUMENTS

| | | |
|---|---|---|
| 2003/0206587 A1 | 11/2003 | Gomila |
| 2006/0013308 A1 | 1/2006 | Kim |
| 2006/0153464 A1 | 7/2006 | Song et al. |
| 2006/0210156 A1 | 9/2006 | Lei et al. |
| 2006/0233251 A1* | 10/2006 | Kim et al. ................. 375/240.12 |
| 2007/0230585 A1* | 10/2007 | Kim et al. ................. 375/240.26 |

FOREIGN PATENT DOCUMENTS

| | | |
|---|---|---|
| KR | 10-2006-0081726 A | 7/2006 |
| KR | 10-2006-0108253 | 10/2006 |
| WO | WO 2006/112653 A1 | 10/2006 |
| WO | WO 2007/010690 A1 | 1/2007 |

(Continued)

OTHER PUBLICATIONS

"Advanced video coding for generic audiovisual services", Series H: Audiovisual and Multimedia Systems: Infrastructure of audiovisual services—Coding of moving video, International Telecommunication Union (ITU), ITU-T Recommendation H.264, Mar. 2005, 341 Pages.

(Continued)

*Primary Examiner* — Kibrom T Hailu
*Assistant Examiner* — Zewdu A Beyen
(74) *Attorney, Agent, or Firm* — Birch, Stewart, Kolasch & Birch, LLP

(57) ABSTRACT

Encoding and decoding are uniformly carried out for a plurality of chroma formats. Based on a control signal for providing a chroma format type of an input moving image signal, in the case of a chroma format of 4:2:0 or 4:2:2, a first intra prediction mode deciding unit and a first intra prediction image generation unit are applied to a luminance component of the input moving image signal, and a second intra prediction mode deciding unit and a second intra prediction image generation unit are applied to a chrominance component. In the case of a chroma format of 4:4:4, the first intra prediction mode deciding unit and the first intra prediction image generation unit are applied to all color components to carry out encoding, and a variable length encoding unit multiplexes the control signal as encoding data to be applied to a moving image sequence unit on a bit stream.

2 Claims, 21 Drawing Sheets

FOREIGN PATENT DOCUMENTS

WO    WO 2007/034601 A1    3/2007

OTHER PUBLICATIONS

U.S. Appl. No. 11/925,183, filed Oct. 26, 2007, Sekiguchi, et al.
U.S. Appl. No. 11/926,881, filed Oct. 29, 2007, Yamada, et al.
U.S. Appl. No. 11/926,848, filed Oct. 29, 2007, Yamada, et al.
U.S. Appl. No. 11/926,593, filed Oct. 29, 2007, Yamada, et al.
Wittmann, Steffen et al., "SEI message on post-filter hints for high fidelity", Joint Video Team (JVT) of ISO/IEC MPEG&ITU-T VCEG (ISO/IEC/JTC1/SC29/WG11 and ITU-T SG16 Q.6), Jul. 2006.
Marpe et al., "H.264/MPEG4-AVC Fidelity Range Extensions: Tools, Profiles, Performance, and Application Areas," Image Processing, International Conference on Genova, Italy, Sep. 11-14, 2005, vol. 1, pp. 593-596.
Wedi et al., "4:4:4 Intra-only coding," ITU Study Group 16—Video Coding Experts Group—ISO/IEC MPEG & ITU-T VCEG (ISO/IECJTC1/SC29/WG11 and ITU-T SG16 Q6) Jul. 21, 2005, 7 pages.
Wittmann et al., "Intra-only 4:4:4 Profile for H.264/AVC FRExt", Joint Video Team (JVT) of ISO/IEC MPEG & ITU-T VCEG (ISO/IEC JTC1/SC29/WG11 and ITU-T SG16 Q.6), 22 pages, Oct. 2005.

* cited by examiner

FIG. 6
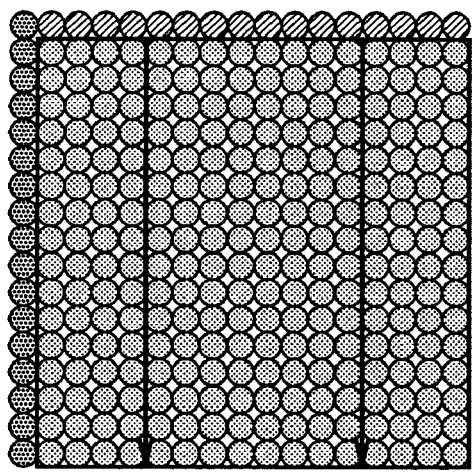
mode0
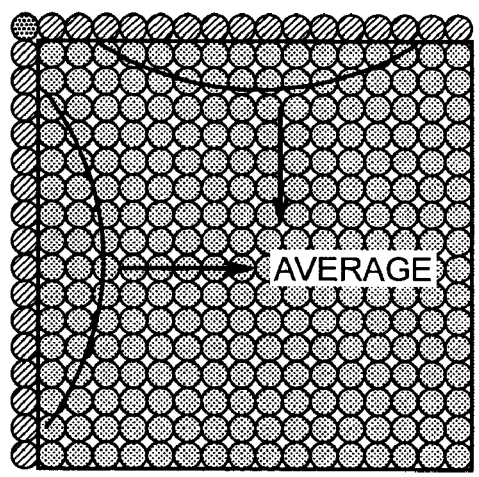
mode2
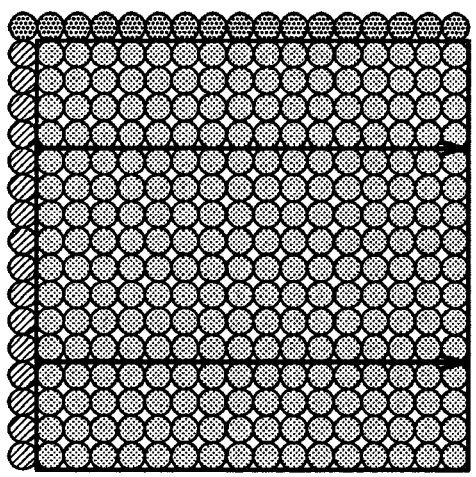
mode1
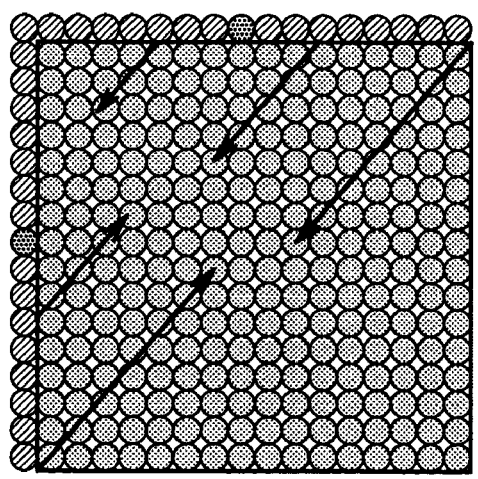
mode3
INTRA 16x16 PREDICTION 4:2:0/4:2:2 Cb/Cr INTRA PREDICTION WHEN MOTION VECTOR INDICATES THIS PIXEL POSITION, PREDICTED PIXEL VALUE IS GENERATED BY LINEAR INTERPOLATION PROCESS BASED ON 4 INTEGER PIXELS IN VICINITY THEREOF 4:2:0/4:2:2 Cb/Cr MOTION COMPENSATION PREDICTED IMAGE GENERATION PROCESS

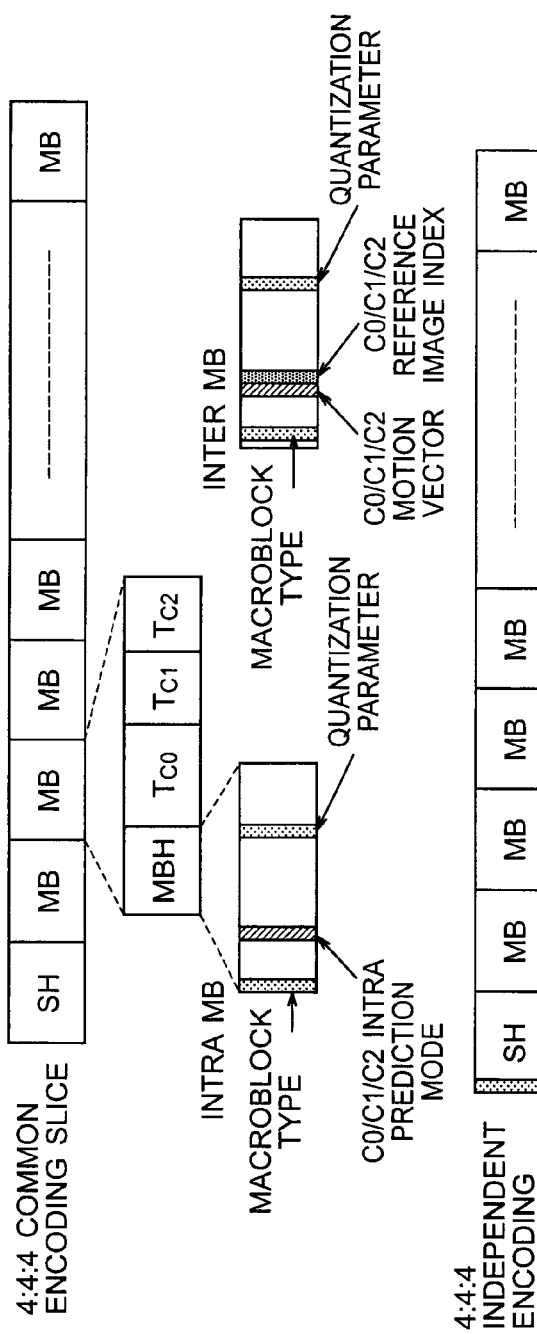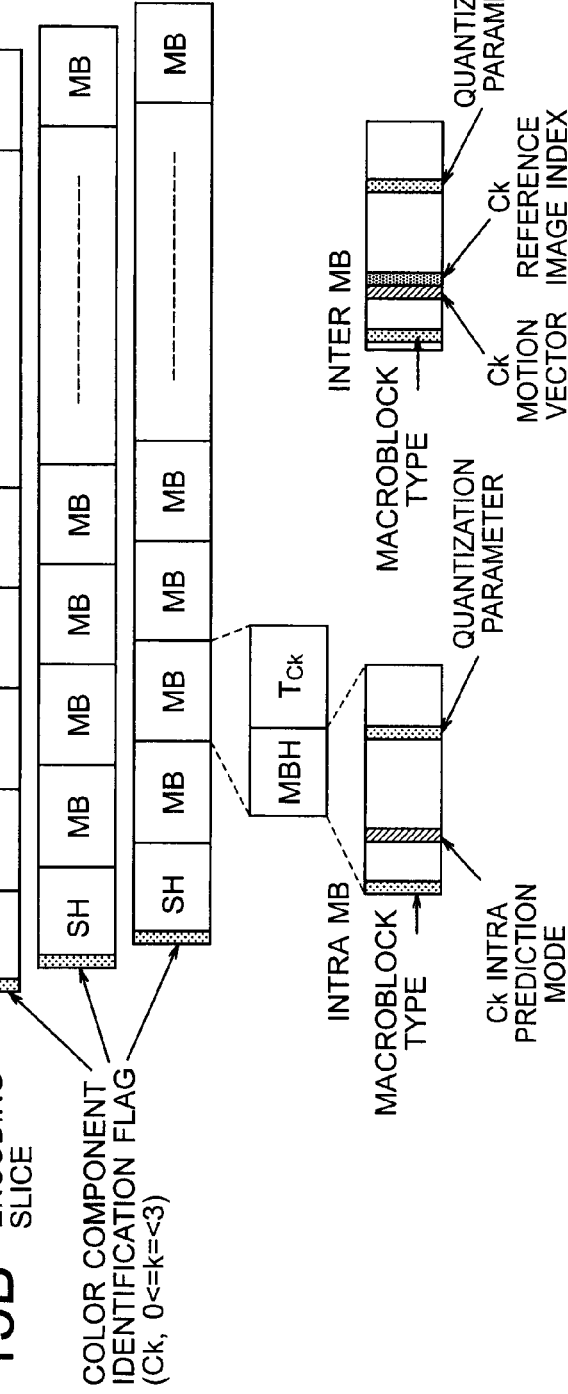
FIG. 15A 4:4:4 COMMON ENCODING SLICE
FIG. 15B 4:4:4 INDEPENDENT ENCODING SLICE

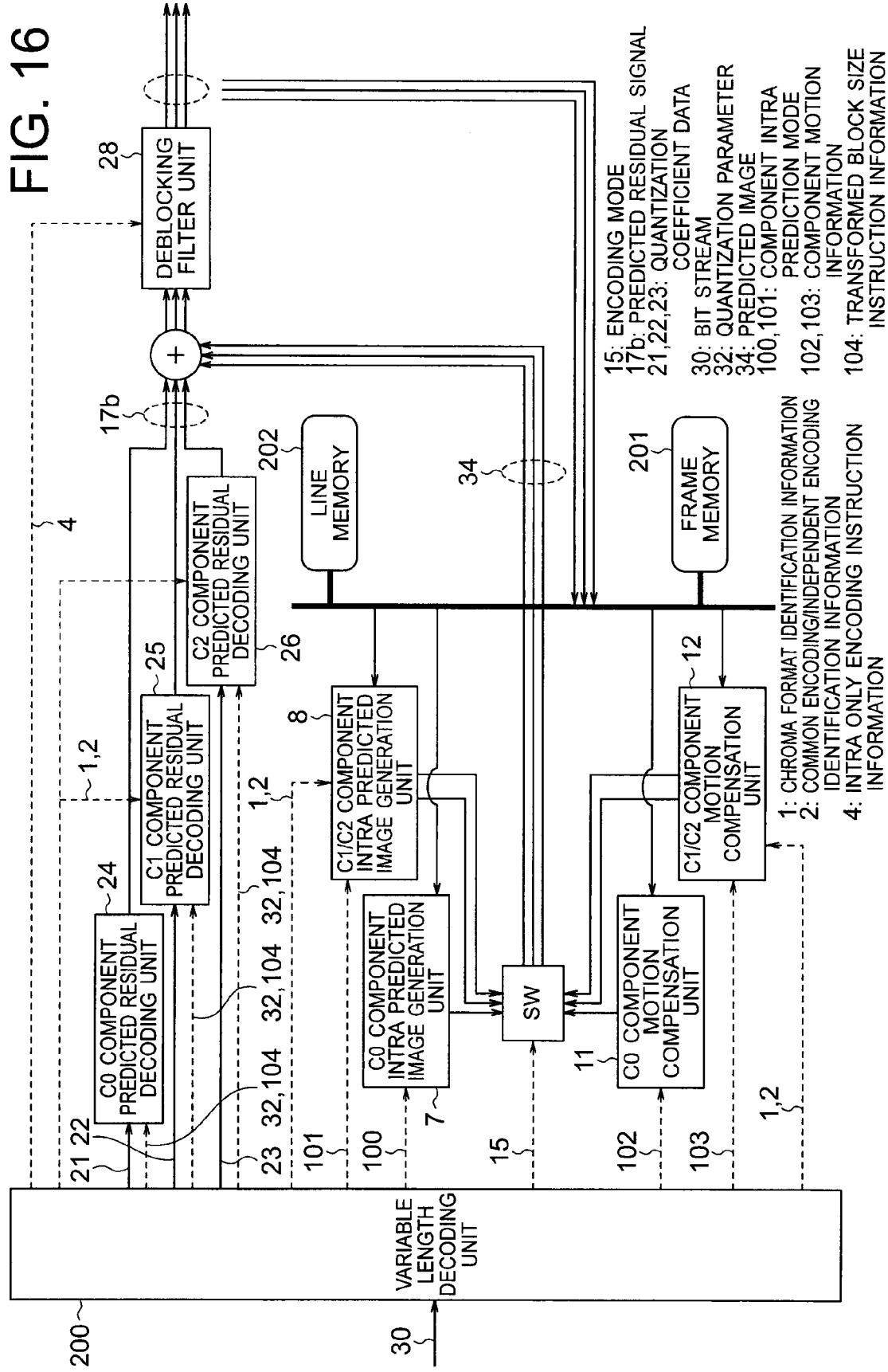

SWITCHING OF INTRA PREDICTION BY Cb/Cr COMPONENT
ACCORDING TO CHROMA FORMAT

SWITCHING OF MC BY Cb/Cr COMPONENT
ACCORDING TO CHROMA FORMAT (A) 4:2:0 Cb/Cr PREDICTED RESIDUAL DECODING PROCESS (B) 4:2:2 Cb/Cr PREDICTED RESIDUAL DECODING PROCESS

MOVING IMAGE DECODING DEVICE AND MOVING IMAGE DECODING METHOD

BACKGROUND OF THE INVENTION

1. Field of the Invention

The present invention relates to a digital image signal encoding device, a digital image signal decoding device, a digital image signal encoding method, and a digital image signal decoding method used for an image compression encoding technology or a compressed image data transmission technology.

2. Description of the Related Art

An international standard video encoding system such as MPEG or ITU-TH. 26x (e.g., "Information Technology Coding of Audio-Visual Objects Part 10: Advanced Video Coding", ISO/IEC 14496-10, 2003: (hereinafter, referred to as Non-Patent Document 1)) has conventionally been premised on use of a standardized input signal format called a 4:2:0 format. The 4:2:0 format is a format where a color moving image signal of RGB or the like is transformed into a luminance component (Y) and two chrominance components (Cb, Cr), and the number of chrominance component samples is reduced to half of luminance components both in horizontal and vertical directions (FIG. 23). The chrominance component is inferior to the luminance component in visibility. Accordingly, the conventional international standard video encoding system has been based on the premise that the amount of original information to be encoded is reduced by downsampling chrominance components before encoding is executed as mentioned above. In video encoding for business purposes such as a broadcast material video, a 4:2:2 format for downsampling Cb and Cr components reduce the number of the components to half of that of luminance components only in a horizontal direction may be used. Thus, color resolution in a vertical direction becomes equal to luminance, thereby increasing color reproducibility compared with the 4:2:0 format. On the other hand, recent increases in resolution and gradation of a video display have been accompanied by studies on a system for performing encoding by maintaining the number of samples equal to that of luminance components without downsampling chrominance components. A format where the numbers of luminance and chrominance component samples are completely equal is called a 4:4:4 format. The conventional 4:2:0 format has been limited to Y, Cb, and Cr color space definitions because of the premise of down-sampling of chrominance components. In the case of the 4:4:4 format, however, because there is no sample ratio distinction between color components, R, G, and B can be directly used in addition to Y, Cb, and Cr, and a plurality of color space definitions can be used. An example of a video encoding system targeting the 4:4:4 format is, Woo-Shik Kim, Dae-Sung Cho, and Hyun Mun Kim, "INTER-PLANE PREDICTION FOR RGB VIDEO CODING", ICIP 2004, October 2004. (hereinafter, referred to as Non-Patent Document 2).

In a high 4:2:0 profile encoding the 4:2:0 format of AVC of the Non-Patent Document 1, in a macroblock area composed of luminance components 16×16 pixels, corresponding chrominance components are 8×8 pixel blocks for both Cb and Cr. In motion compensation prediction of the high 4:2:0 profile, block size information which becomes a unit of motion compensation prediction, reference image information used for prediction, and motion vector information of each block are multiplexed only for the luminance components, and motion compensation prediction is carried out for chrominance components by the same information as that of the luminance components. The 4:2:0 format has characteristics in color space definition that almost all pieces of structure information of an image is integrated into a (texture) luminance component, distortion visibility is lower for a chrominance component than for the luminance component, and a contribution to video reproducibility is small, and prediction and encoding of the high 4:2:0 profile are based on such characteristics of the 4:2:0 format. On the other hand, in the case of the 4:4:4 format, three color components equally hold texture information. The system for performing motion compensation prediction based on inter prediction mode, reference image information, and motion vector information depending only on one component is not necessarily an optimal method in the 4:4:4 format where the color components make equal contributions in representing a structure of an image signal. Thus, the encoding system targeting the 4:2:0 format performs different signal processing from the encoding system targeting the 4:4:4 format to execute optimal encoding, and definitions of pieces of information multiplexed in an encoded bit stream are also different. As a result, to construct a decoding device capable of decoding compressed video data of a plurality of different formats, a configuration where bit streams for signals of the formats are individually interpreted needs to be employed, thereby making a device configuration inefficient.

SUMMARY OF THE INVENTION

It is therefore an object of the present invention to provide a bit stream generation method for providing compatibility between a bit stream encoded in a Y, Cb, and Cr space as in the case of the conventional 4:2:0 format and a bit stream having no sample ratio distinction between color components such as the 4:4:4 format and obtained by compressing a video signal having freedom in color space definition, and a decoding method.

A moving image encoding device that receives, compresses, and encodes a digital moving image signal includes: a first intra prediction mode deciding unit for performing intra prediction on a signal component corresponding to a luminance component in a case where a chroma format of the input moving image signal is 4:2:0 or 4:2:2; a second intra prediction mode deciding unit for performing intra prediction on a signal component corresponding to a chrominance component in the case where the chroma format of the input moving image signal is 4:2:0 or 4:2:2; a variable length encoding unit for variable-length encoding a first intra prediction mode determined by the first intra prediction mode deciding unit or a second intra prediction mode determined by the second intra prediction mode deciding unit; a first intra prediction image generation unit for generating a first intra prediction image based on the first intra prediction mode; a second intra prediction image generation unit for generating a second intra prediction image based on the second intra prediction mode; and a encoding unit for performing transform and encoding on a predicted error signal obtained as a difference between the first intra prediction image or the second intra prediction image and corresponding color component signals of the input moving image signal. Based on a control signal for providing a chroma format type of the input moving image signal, in the case of a chroma format of 4:2:0 or 4:2:2, the first intra prediction mode deciding unit and the first intra prediction image generation unit are applied to the luminance component of the input moving image signal, and the second intra prediction mode deciding unit and the second intra prediction image generation unit are applied to the chrominance component of the input moving image signal. In the case of a chroma format of 4:4:4, the first intra prediction mode deciding unit and the first intra prediction image generation unit are applied to all color components of the input moving image signal to perform encoding, and the variable length encoding unit multiplexes the control signal as encoding data to be applied to a moving image sequence unit on a bit stream.

Encoding/decoding can be performed for the plurality of different chroma formats such as 4:2:0, 4:2:2, and 4:4:4 in a unified manner by the efficient device configuration, and mutual connectability between the video encoded data can be increased.

BRIEF DESCRIPTION OF THE DRAWINGS

In the accompanying drawings:

FIG. 6 are explanatory diagrams showing intra 16×16 prediction modes;

FIGS. 15A and 15B are explanatory diagrams showing common and independent encoded slices of 4:4:4;

FIG. 16 is a block diagram showing a configuration of a decoding device according to the first embodiment of the present invention;

DETAILED DESCRIPTION OF THE PREFERRED EMBODIMENTS

First Embodiment

A first embodiment of the present invention relates to an encoding device which receives one of a video signal of a chroma format of 4:2:0 or 4:2:2 defined in a (Y, Cb, and Cr) color space and a video signal of a chroma format of 4:4:4 defined in a (R, G, and B), (Y, Cb, and Cr), or (X, Y, and Z) color space to perform video encoding, and outputs a bit stream, and a decoding device which receives the encoded bit stream generated by the encoding device to restore an image signal. In the description below, three color components will generically be referred to as (C0, C1, and C2) components and, in the case of 4:2:0 and 4:2:2 chroma formats, C0, C1, and C2 components will be regarded as a Y component, a Cb component, and a Cr component, respectively.

Figure 1:
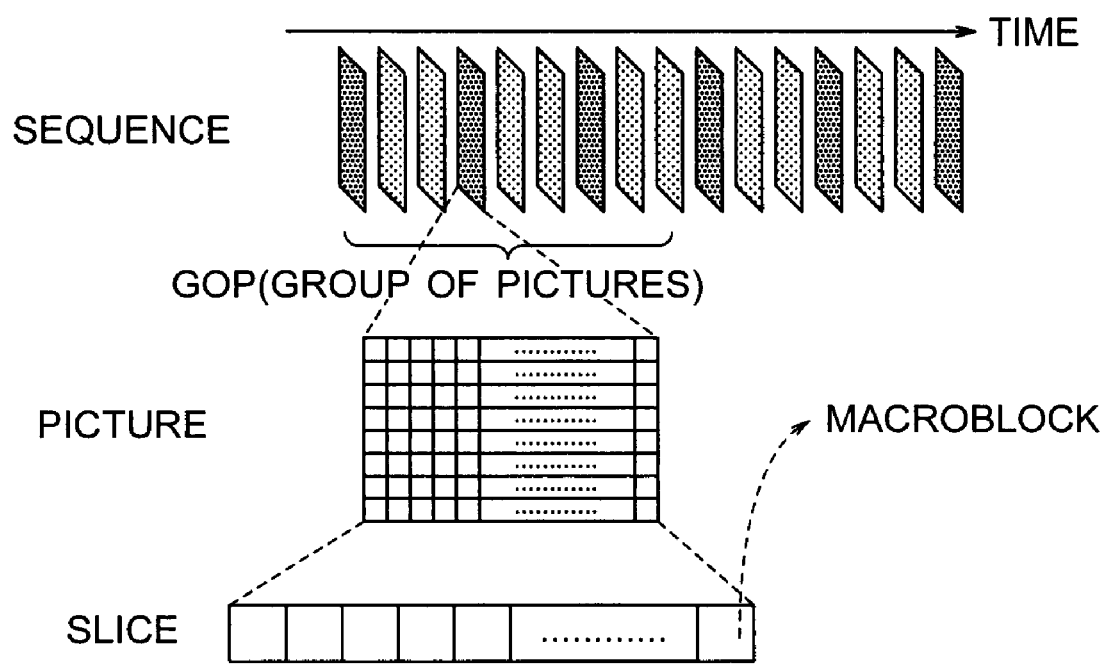
FIG. 1 is an explanatory diagram showing a relation among a sequence, a picture, a slice, and a macroblock.

As shown in FIG. 1, the encoding device of the first embodiment of the present invention receives a video signal represented as time-sequential data of screen information (hereinafter, called picture) defined by a frame or field unit through time sampling. A data unit including time-sequentially arrayed pictures is called a sequence. The sequence may be divided into some groups of pictures (GOP). The GOP is used for the purpose of guaranteeing execution of decoding from any arbitrary GOP head without dependence on other GOP, and random access to a bit stream. The picture is further divided into square blocks called macroblocks, and applied to a prediction, transform, or quantization process by a macroblock unit to perform video compression. A unit formed by collecting a plurality of macroblocks is called slice. The slice is a data unit to be encoded or decoded independently of a different slice. For example, when a video signal having resolution equal to or higher than that of an HDTV is processed in real time, slice division is executed to encode or decode divided slices in parallel, thereby shortening computing time. When a bit stream is transmitted through a high error rate line, even if a certain slice is destroyed by an influence of an error to disturb a decoded image, a correct decoding process is restored from a next slice. Generally, in a slice boundary, prediction using signal dependence with an adjacent slice cannot be used. Thus, as the number of slices is increased, flexibility of the parallel process and resistance to errors are increased while encoding performance is reduced.

Figure 23:
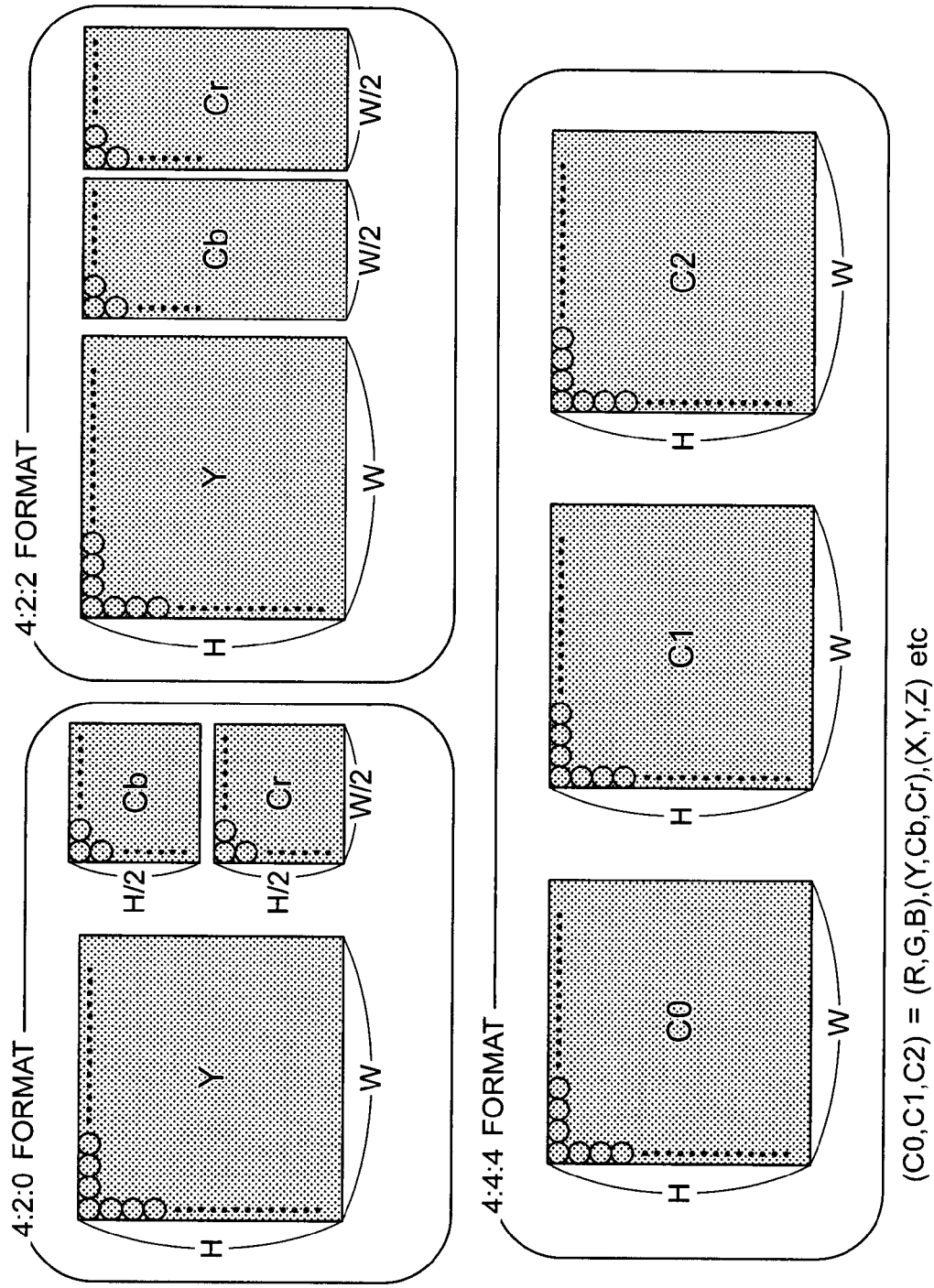
FIG. 23 are explanatory diagrams showing formats.

A macroblock in the case of each chroma format of 4:2:0, 4:2:2, or 4:4:4 is defined as a pixel block of W=H=16 in FIG. 23. In order to carry out video compression through the prediction, transform, or quantization process by a macroblock unit, encoded data of the macroblock multiplexed on a bit stream largely contains two types of information. One is a type of side information different from a video signal itself, such as a prediction mode, motion prediction information, or quantization parameter, and those pieces of information are collectively called a macroblock header. Another is information of the video signal itself. According to the first embodiment of the present invention, a video signal to be encoded is compressed data of a predicted error signal obtained as a result of executing prediction, transform, or quantization based on information of the macroblock header, and represented in a quantized form of a transform coefficient. Thus, the video signal will be referred to as quantized coefficient data hereinafter.

Figure 2:
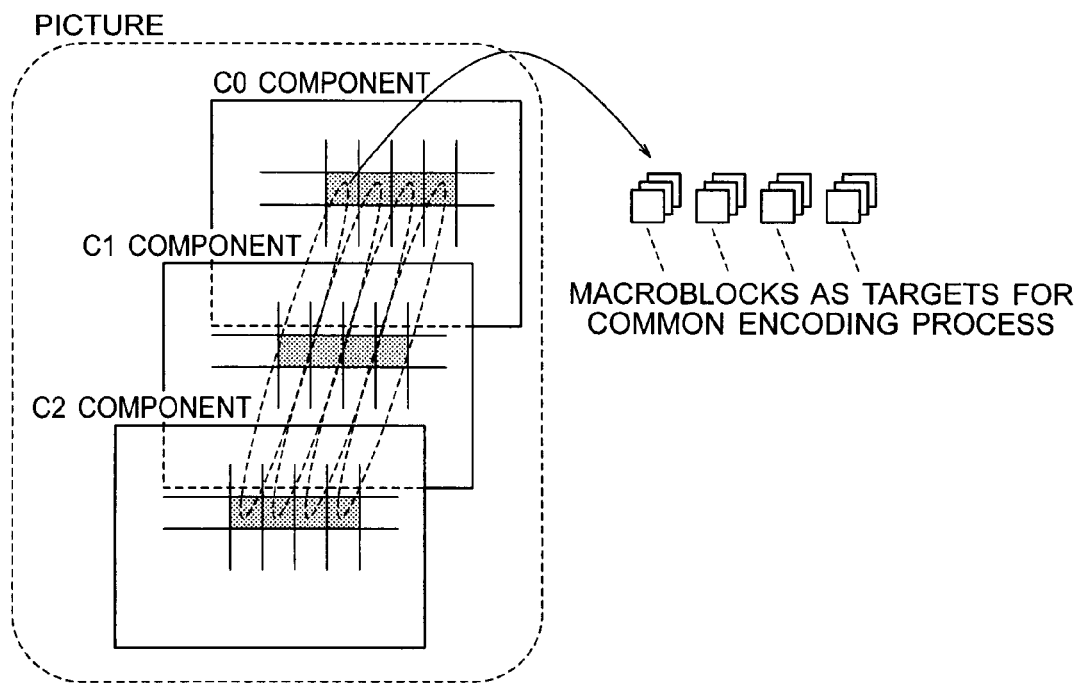
FIG. 2 is an explanatory diagram showing a common encoding process.
Figure 3:
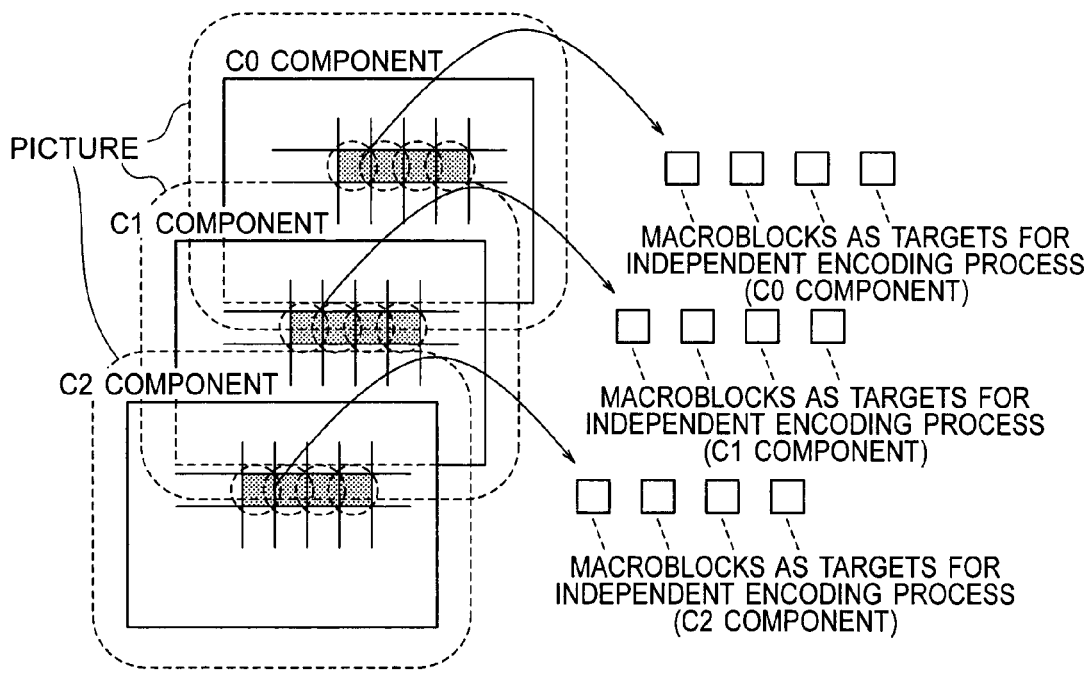
FIG. 3 is an explanatory diagram showing an independent encoding process.

Hereinafter, a process of encoding three color component signals of one frame or one field based on a common macroblock header will be referred to as "common encoding process", and a process of encoding three color component signals of one frame or one field based on individual independent macroblock headers will be referred to as "independent encoding process". Similarly, a process of decoding image data from a bit stream obtained by encoding the three color component signals of one frame or one field based on the common macroblock header will be referred to as "common decoding process", and a process of decoding image data from a bit stream obtained by encoding the three color component signals of one frame or one field based on the individual independent macroblock headers will be referred to as "independent decoding process". The encoding device of the first embodiment of the present invention is configured to encode a signal of a 4:4:4 chroma format through selected one of the common encoding process or the independent encoding process. In the common encoding process, the three color components of one frame or one field are collectively defined as one picture, and the picture is divided into macroblocks which collect the three color components (FIG. 2). In FIG. 2 and description below, the three color components will be called C0, C1, and C2 components. On the other hand, in the independent encoding process, an input video signal of one frame or one field is separated into three color components, each is defined as a picture, and each picture is divided into macroblocks including signal color components (FIG. 3). In other words, the macroblock to be subjected to a common encoding process contains a sample (pixel) of three color components of C0, C1, and C2, while the macroblock to be subjected to an independent encoding process contains a sample (pixel) of only one of C0, C1, and C2 components. According to the encoding device of the first embodiment of the present invention, the macroblock definition of FIG. 2 is always used for the chroma formats of 4:2:0 and 4:2:2, and an encoding process equivalent to the "common encoding process" or the "common decoding process" is used.

(Encoding Device)

Figure 4:
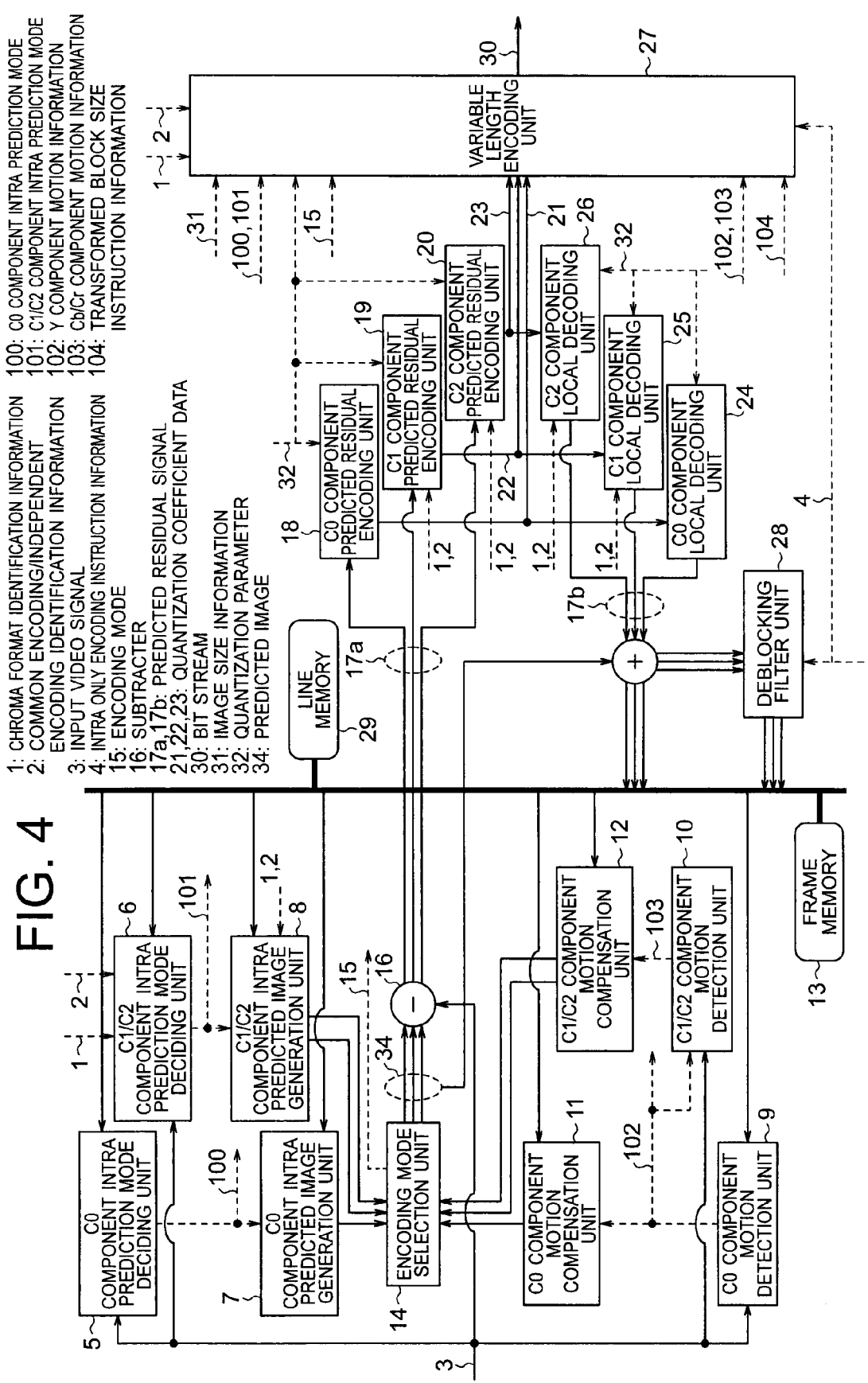
FIG. 4 is a block diagram showing a configuration of an encoding device according to a first embodiment of the present invention.

FIG. 4 shows a configuration of the encoding device according to the first embodiment of the present invention. Hereinafter, information for designating a chroma format of an input video signal to be encoded will be referred to as chroma format identification information 1, and identification information indicating which of encoding through a common encoding process and encoding through an independent encoding process is executed will be referred to as common encoding/independent encoding identification information 2.

An input video signal 3 is first divided into macroblock data of FIG. 2 or 3 based on the chroma format identification information 1 and the common encoding/independent encoding identification information 2. According to intra only encoding instruction information 4, an intra prediction process (C0 component intra prediction mode deciding unit 5, C1/C2 component intra prediction mode deciding unit 6, C0 component intra prediction image generation unit 7, and C1/C2 component intra prediction image generation unit 8), and a motion compensation prediction process (C0 component motion detection unit 9, C1/C2 component motion detection unit 10, C0 component motion compensation unit 11, and C1/C2 motion compensation unit 12) are carried out to select a prediction mode (encoding mode selection unit 14) most efficient to encode the macroblock, a predicted residual is transformed or quantized (C0 component predicted residual encoding unit 18, C1 component predicted residual encoding unit 19, and C2 component predicted residual encoding unit 20), and side information such as a predicted mode or motion information and a quantized transform coefficient are encoded in a variable length manner to generate a bit stream 30 (variable length encoding unit 27). The quantized transform coefficient is locally decoded (C0 component local decoding unit 24, C1 component local decoding unit 25, and C2 component local decoding unit 26), and a predicted image obtained based on the side information and reference image data is added to obtain a local decoded image. If necessary, a deblocking filtering (deblocking filter unit 28) is executed to suppress block boundary distortion accompanying the quantization, and then the local decoded image is stored in a frame memory 13 and/or a line memory 12 to be used for subsequent prediction processes. When the intra only encoding instruction information 4 indicates "execute only intra encoding", only an intra prediction process will be executed without executing a motion compensation prediction process.

Hereinafter, features of the first embodiment of the present invention, i.e., the intra prediction process, the motion compensation prediction process, the predicted residual encoding process, and the variable length encoding process (and bit stream configuration obtained as a result) which execute process switching based on the chroma format identification information 1, the common encoding/independent encoding identification information 2, the intra only encoding instruction information 4, and the like will be described in detail.

(1) Intra Prediction Process

The intra prediction process is carried out by the C0 component intra prediction mode deciding unit 5, the C1/C2 component intra prediction mode deciding unit 6, the C0 component intra predicted image generation unit 7, and the C1/C2 component intra predicted image generation unit 8 of FIG. 4.

Figure 5:
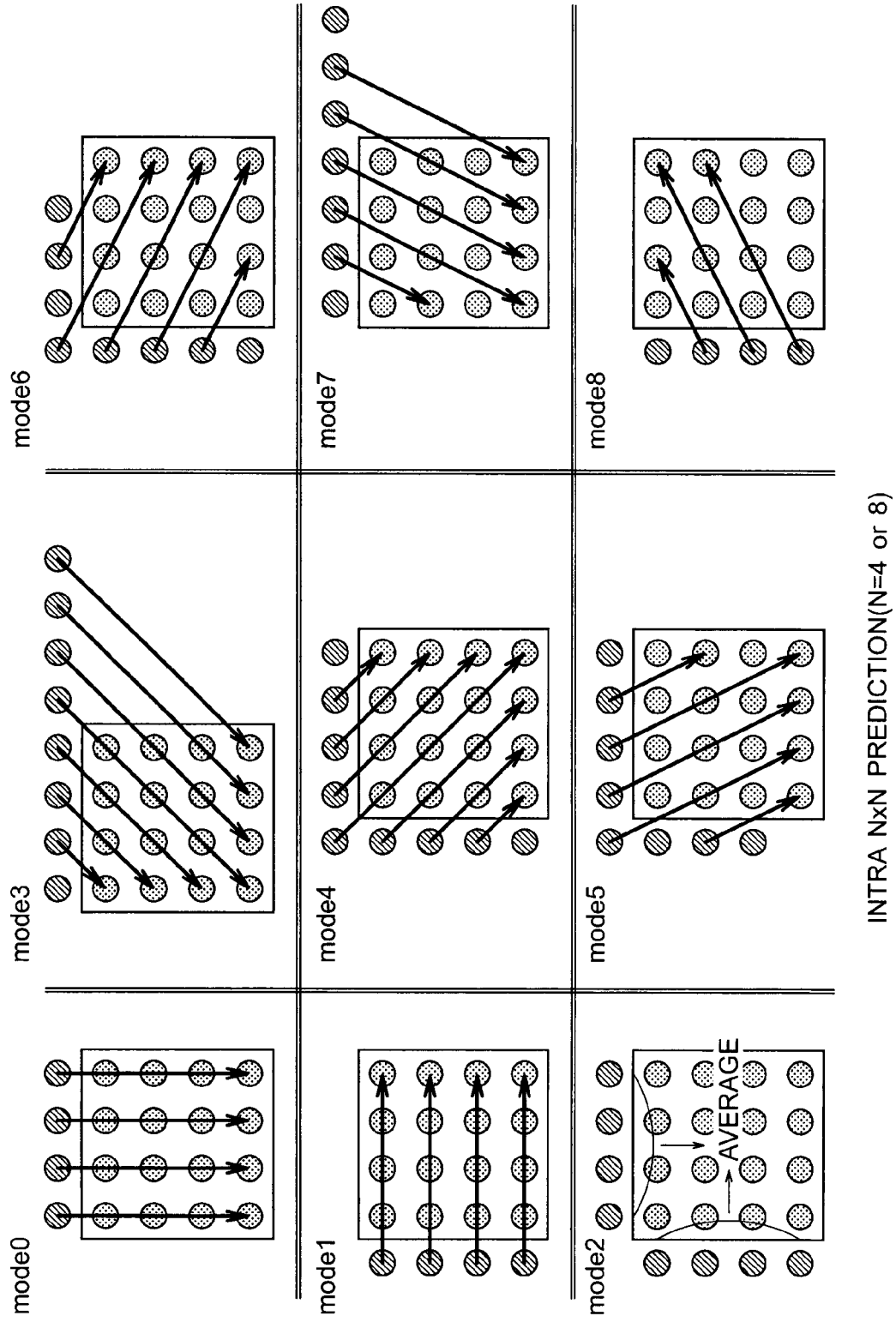
FIG. 5 are explanatory diagrams showing intra N×N prediction modes (N=4 or 8)

In the case of the chroma formats of 4:2:0 and 4:2:2, for a signal of a Y component, a C0 component intra prediction mode 100 is decided by the C0 component intra prediction mode deciding unit 5. In this case, there are three selectable types of modes, an intra 4×4 prediction mode, an intra 8×8 prediction mode, and an intra 16×16 prediction mode. For the intra 4×4 prediction mode and the intra 8×8 prediction mode, a macroblock is divided into blocks of 4×4 pixels or 8×8 pixels, and space prediction using a near reference pixel is carried out for each block as shown in FIG. 5. This prediction method has nine options. Which of the nine methods has been used to execute prediction is encoded as one piece of side information in the form of an intra prediction mode. 4×4 pixels enclosed in a rectangle of FIG. 5 are pixels to be predicted, and a pixel marked out by an oblique line is a reference pixel for generating a predicted image. An arrow indicates a direction in which the reference pixel affects a predicted value. In Mode 2, an average value of the reference pixels is a predicted value. FIG. 5 show example of 4×4 block. For an 8×8 pixel block, a similar mode is defined. Through space prediction having the above directionality, effective prediction can be made for structure information of an image such as a profile of a subject or a texture pattern.

There is employed an intra 16×16 prediction mode as a mode of executing intra prediction at a 16×16 block without subdividing macroblocks (FIG. 6). In this case, four types of space prediction methods shown in FIG. 6 can be selected. This mode is effective as a mode of increasing prediction effects by a small amount of side information for an image area where a picture is flat.

Figure 7:
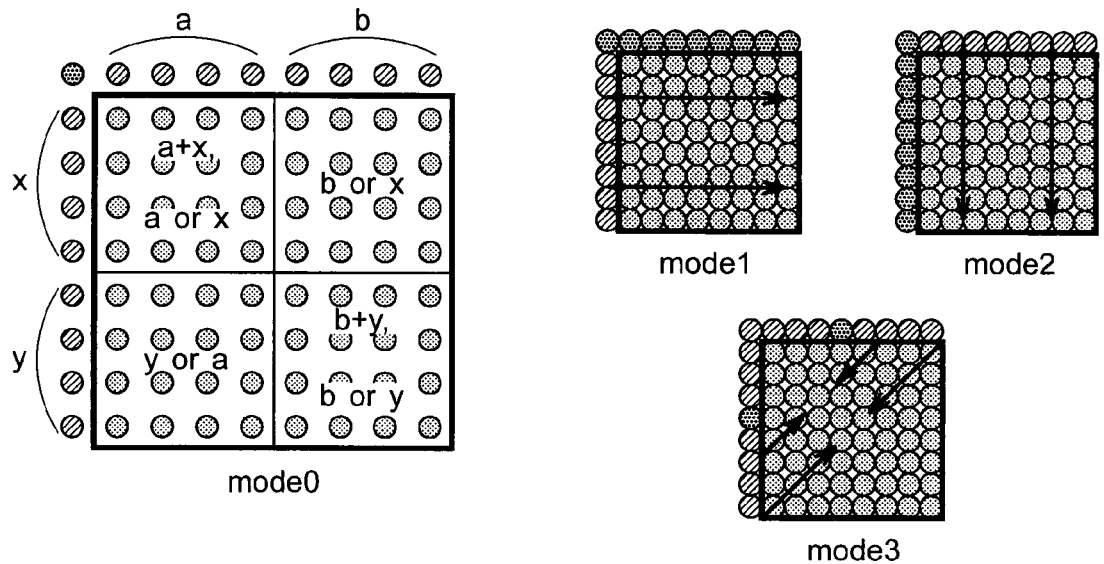
FIG. 7 are explanatory diagrams showing 4:2:0/4:2:2 Cb/Cr intra prediction modes.
Figure 8:
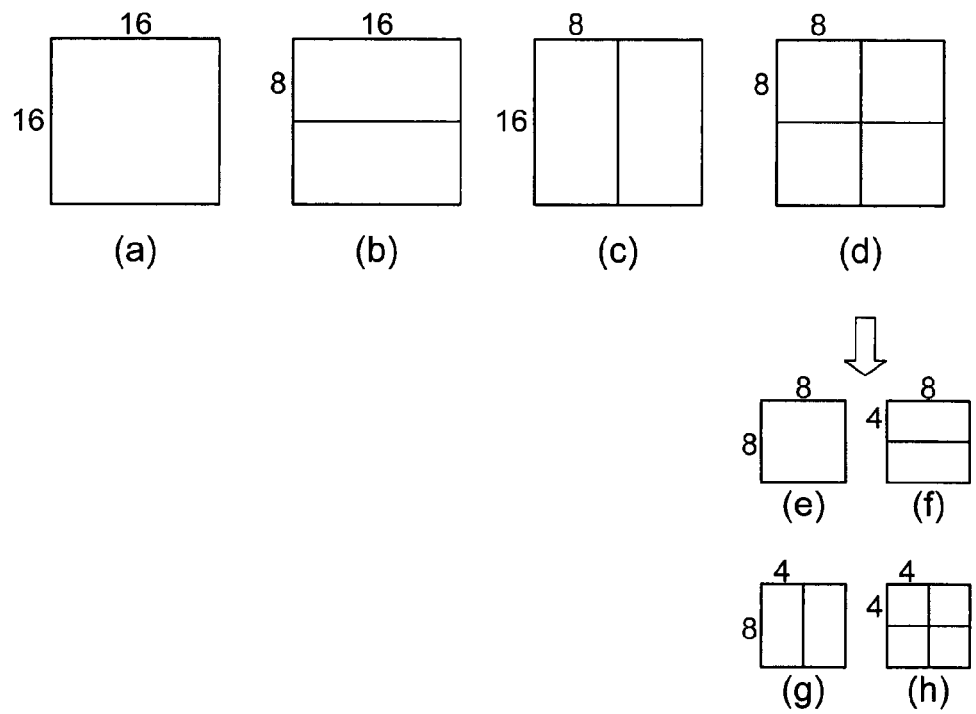
FIG. 8A to 8H are explanatory diagrams showing macroblock units.

For Cb and Cr components, by the C1/C2 component intra prediction mode deciding unit 6, a C1/C2 component intra prediction mode 101 different from the Y component (those corresponding to C1 and C2 are 101a and 101b, respectively. Note that 101a and 101b are always equal in value in the case of 4:2:0 and 4:2:2, and one of 101a and 101b is multiplexed on a bit stream. A decoder sets decoded values as 101a and 101b) is decided. FIG. 7 show intra prediction modes of Cb and Cr components which can be selected in the case of the chroma formats of 4:2:0 and 4:2:2. FIG. 7 show the case of the format 4:2:0, and the same modes are used for the format of 4:2:2. Only for a mode 0 among the four modes, a macroblock equivalent area of Cb and Cr (8×8 pixel block in the case of 4:2:0, and 8×16 pixel block in the case of 4:2:2) is divided into 4×4 blocks, and an average value is predicted from the sides by 4×4 block units. For example, for a 4×4 block of the upper left part, all 8 pixels of areas "a" and "x" are averaged, or 4 pixels of "a" or "x" are averaged, and one of those average values is used as a predicted value. For modes 1, 2, and 3, as in the case of FIGS. 5 and 6, space prediction having directionality is carried out. In the case of the chroma formats of 4:2:0 and 4:2:2, pieces of structure information such as image texture are integrated into a Y component, while no structure information of an image is stored for the Cb and Cr components which are chrominance component signals. Accordingly, efficient prediction is carried out by the above simple prediction mode.

In the case of the chroma format of 4:4:4, C0, C1, and C2 components are not fixed at Y, Cb, or Cr, but image structure information equivalent to a Y component is held in each color component in a color space of R, G, or B. Thus, satisfactory prediction efficiency may not be obtained by prediction for the Cb and Cr components. Thus, according to the encoding device of the first embodiment of the present invention, in the case of the chroma format of 4:4:4, for C0, C1, and C2, an intra prediction mode is selected by a process equivalent to the intra prediction mode deciding unit 5 of the C0 component. More specifically, if the common encoding/independent encoding identification information 2 indicates "common encoding process", C0, C1, and C2 components are predicted in only one common intra prediction mode. On the other hand, if the common encoding/independent encoding identification information indicates "independent encoding process", C0, C1, and C2 components are predicted in individually obtained intra prediction modes. In other words, if a chroma format is 4:4:4, and the common encoding/independent encoding identification information 2 indicates "common encoding process", C0, C1, and C2 components are all subjected to intra prediction in the C0 component intra prediction mode 100. If a chroma format is 4:4:4, and the common encoding/independent encoding identification information 2 indicates "independent encoding process", C1 and C2 components are subjected to intra prediction in the intra prediction modes 101a and 101b of C1 and C2 components obtained independently of the C0 component from the intra prediction mode corresponding to the C0 component shown in FIG. 5 or 6.

According to the configuration of the encoding device shown in FIG. 4, if the chroma format is 4:4:4, and the common encoding/independent encoding identification information 2 indicates "common encoding process", a prediction mode is decided for the C0 component by the C0 component intra prediction mode deciding unit 5, and the prediction mode for the C0 component is directly used or the C1/C2 component intra prediction mode deciding unit 6 is used in combination for the C1 and C2 components to decide only one intra prediction mode optimal for all the C0, C1, and C2 components. If the chroma format is 4:4:4, and the common encoding/independent encoding identification information 2 indicates "independent encoding process", a prediction mode is decided for the C0 component by the C0 component intra prediction mode deciding unit 5, and optimal intra prediction modes are individually decided for the C1 and C2 components by the C1/C2 component intra prediction mode deciding unit 6.

In all the intra prediction mode processes, a peripheral pixel value which becomes a reference pixel has to be a local decoded image not subjected to deblocking filtering. Thus, a pixel value before a deblocking filtering process obtained by adding together a local decoded predicted residual signal 17b which is an output of each of the C0 component local decoded unit 24, C1 component local decoded unit 25, and C2 component local decoded unit 26 and a predicted image 34 is stored in the line memory 29 to be used for intra prediction.

Based on the intra prediction modes of the respective color components decided through the aforementioned process, predicted images are generated by the C0 component intra predicted image generation unit 7 and the C1/C2 component intra predicted image generation unit 8. Common members are used for the C0 component intra predicted image generation unit 7 and the C1/C2 intra predicted image generation unit 8 in the decoding device, and thus a detailed operation will be described in the description of the decoding device side.

(2) Motion Compensation Prediction Process

The motion compensation prediction process is carried out by the C0 component motion detection unit 9, the C1/C2 component motion detection unit 10, the C0 component motion compensation unit 11, and the C1/C2 component motion compensation unit 12 shown in FIG. 4.

In the case of the chroma formats being 4:2:0 and 4:2:2, for a signal of a Y component, motion information is decided by the C0 component motion detection unit 9. The motion information contains a reference image index for instructing which reference image of one or more reference image data stored in the frame memory 13 is used for prediction, and a motion vector applied for the reference image designated by the reference image index.

In the C0 component motion detection unit 9, a reference image is selected among motion compensation predicted reference image data stored in the frame memory 13 to execute a motion compensation prediction process by a macroblock unit for the Y component. In the frame memory 13, a plurality of reference image data are stored at time immediately before or over a plurality of past/future times, and an optimal reference image is selected among those data by a macroblock unit to carry out motion prediction. There are prepared seven types of block sizes which become units to actually execute motion compensation prediction. First, as shown in FIG. 8A to 8D, any size of 16×16, 16×8, 8×16, and 8×8 is selected by a macroblock unit. Further, when 8×8 is selected, for each 8×8 block, as shown in FIGS. 8E to 8H, any size of 8×8, 8×4, 4×8, and 4×4 is selected. For all or some of the block size/sub block sizes of FIGS. 8A to 8H, a motion vector within a predetermined search range, and one or more usable reference images, a motion compensation prediction process is executed for each macroblock to obtain motion information (motion vector and reference image index) 102 of the Y component. For the Cb and Cr components, the same reference image index as that of the Y component and the motion vector of the Y component are used to obtain motion information 103 of the Cb/Cr component (specifically, the information corresponds to a sample ratio of Y, and Cb and Cr and is obtained by scaling the motion vector of the Y component). This process is carried out by the C1/C2 component motion detection unit 10.

Note that methods of generating motion compensation predicted image candidates to be evaluated by the motion detection unit and predicted images to be generated by the motion compensation unit are different as follows among the Y component, and the Cb and Cr components.

Figure 9:
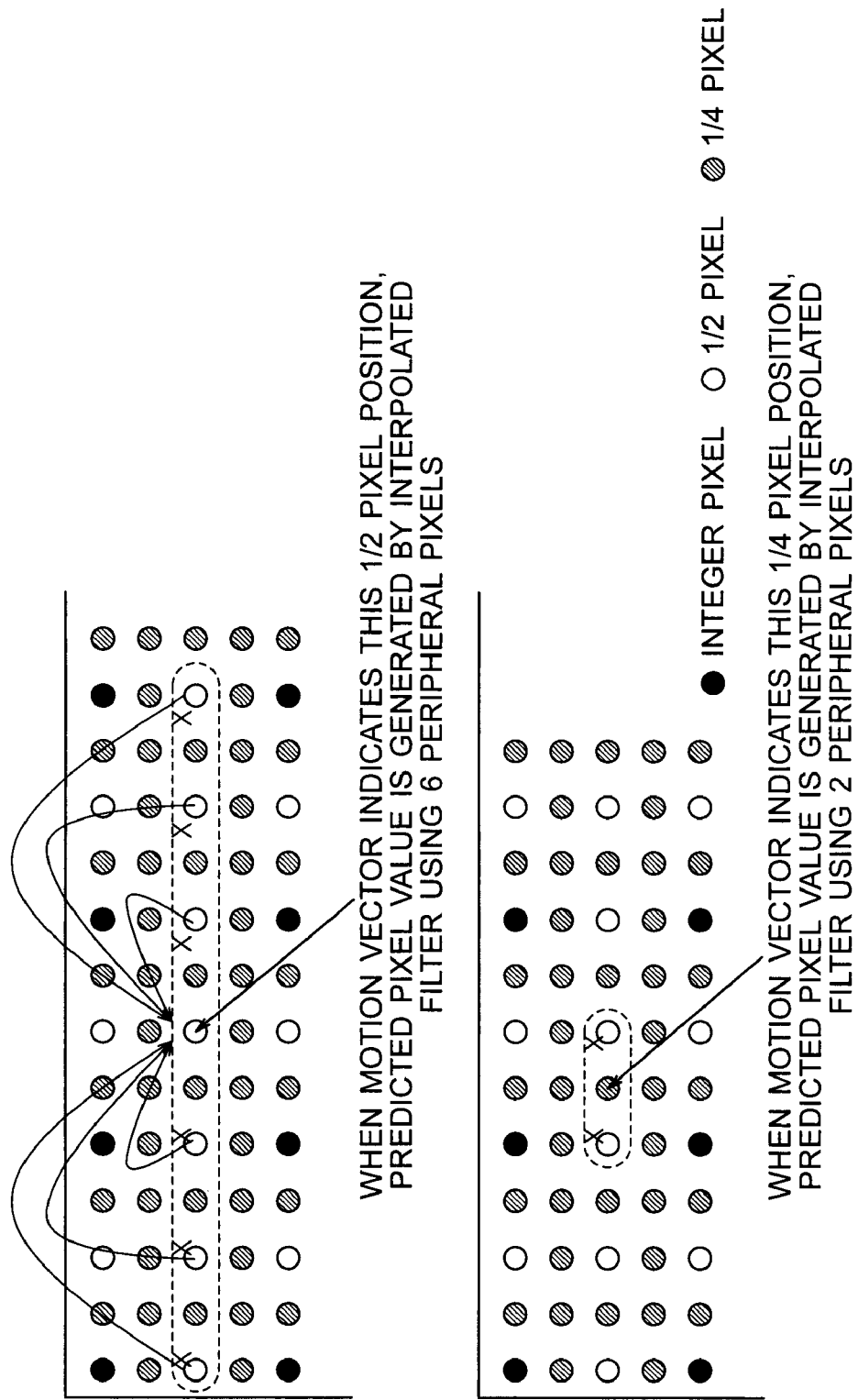
FIG. 9 are explanatory diagrams showing 4:2:0/4:2:2 Y and 4:4:4 motion compensation predicted image generation processes.
Figure 10:
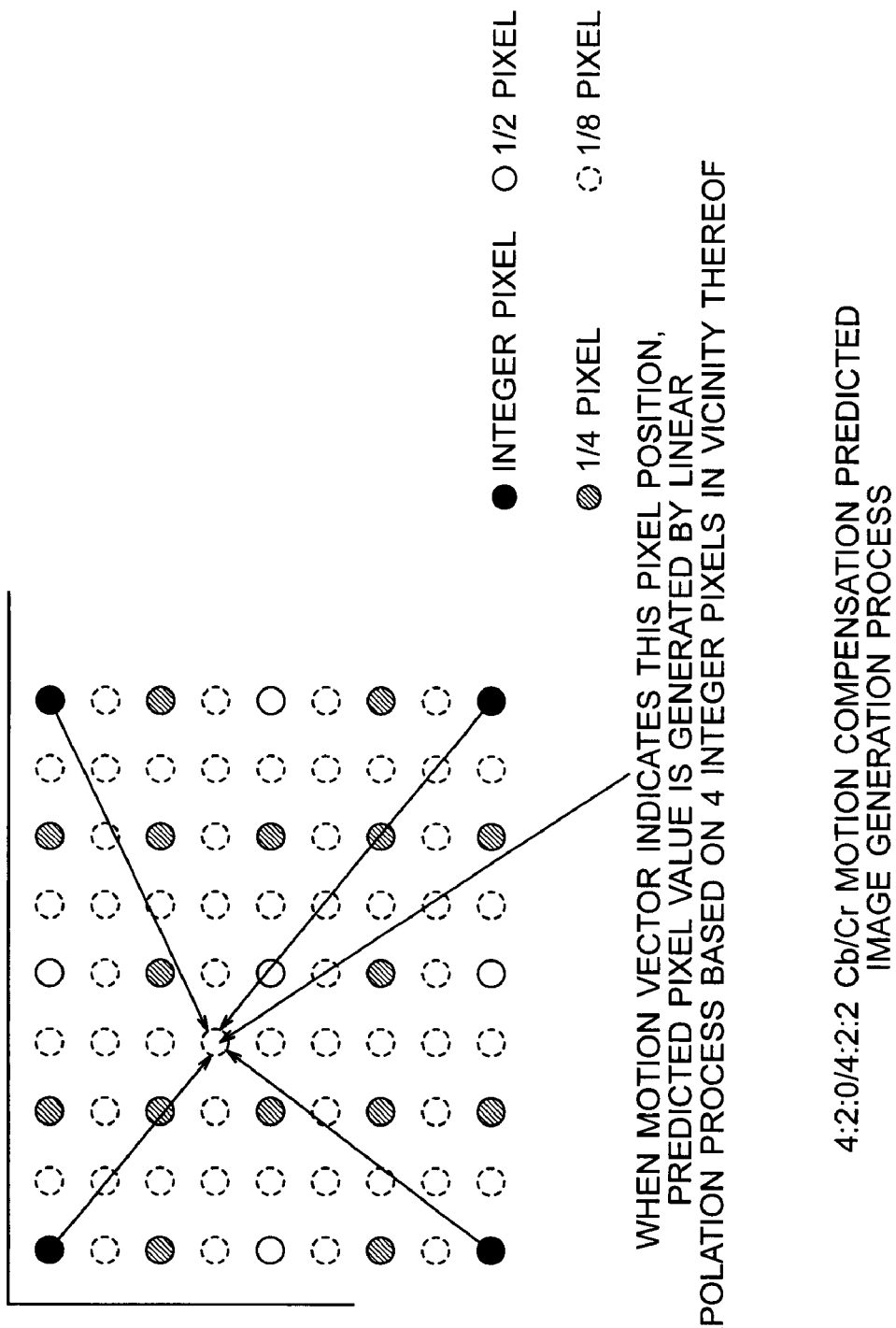
FIG. 10 is an explanatory diagram showing a 4:2:0/4:2:2 Cb/Cr motion compensation predicted image generation process.

For the Y component, not only a pixel (integer pixel) of a position actually input to the encoding device but also pixels of a ½ pixel position which is a middle point between integer pixels, and pixels a ¼ pixel position which is a middle point between ½ pixels are virtually created through an interpolation process to be used for generating predicted images. This situation is shown in FIG. 9. In FIG. 9, to obtain a pixel value of the ½ pixel position, data of its surrounding 6 pixels are used to execute interpolation filtering, thereby obtaining a pixel value. In order to obtain a pixel value of the ¼ pixel position, its surrounding 2 pixels are used to execute linear interpolation through an averaging process, thereby obtaining a pixel value. The motion vector is represented by using ¼ pixel accuracy as a unit. On the other hand, in Cb and Cr predicted image generation, as shown in FIG. 10, a pixel value of a pixel position indicated by a motion vector obtained as a result of scaling a corresponding motion vector of the Y component is calculated from pixel values of integer pixels of its neighboring 4 places through a weighted linear interpolation process according to a distance between pixels.

In the case of the chroma format being 4:4:4, image structure information equivalent to the Y component is held in each color component in a color space of R, G or B while the C0, C1 and C2 are not fixed at Y, Cb, or Cr. Thus, satisfactory prediction efficiency may not be obtained by the predicted image generation method for the Cb and Cr components. Thus, according to the encoding device of the first embodiment, in the case of the chroma format being 4:4:4, a predicted image candidate or a predicted image are generated through the process of the C0 component motion detection unit 9 and the C0 component motion compensation unit 11 together with C0, C1 and C2 to obtain motion information. More specifically, if the common encoding/independent encoding identification information 2 indicates "common encoding process", only common motion information 102 is obtained for the C0, C1 and C2 components. A scaling process is not carried out when a motion vector of a specific color component is applied to the other component as in the case of the 4:2:0 and 4:2:2. On the other hand, if the common encoding/independent encoding identification information 2 indicates "independent encoding process", each motion information is obtained independently for the C0, C1 and C2 components. According to the configuration of the encoding device of FIG. 4, if the chroma format is 4:4:4 and the common encoding/independent encoding identification information 2 indicates "common encoding process", C0 component motion information 102 is decided for the C0 component by the C0 component motion detection unit 9. For the C1 and C2 components, the C0 motion information is directly used or only one piece of motion information 102 optimal for all the C0, C1 and C2 components is decided by using the C1/C2 component motion detection unit 10 in combination. If the chroma format is 4:4:4 and the common encoding/independent encoding identification information 2 indicates "independent encoding process", C0 component motion information 102 is decided by the C0 component motion detection unit 9 for the C0 component. For the C1 and C2 components, individual pieces of optimal motion information 103a and 103b are decided by the C1/C2 component motion detection unit 10.

Based on the motion information decided for each color component through the aforementioned process, predicted images are generated by the C0 component motion compensation unit 11 and the C1/C2 component motion compensation unit 12. As common members are used for the C0 component motion compensation unit 11 and the C1/C2 component motion compensation unit 12 in the decoding device, detailed operations will be described on the decoding device side.

(3) Predicted Residual Encoding Process

An optimal intra prediction mode obtained as a result of the intra prediction process and its predicted image, and optimal motion information (motion vector/reference image index) obtained as a result of the motion compensation prediction process and its predicted image are evaluated by the encoding mode selection unit 14 to select an optimal encoding mode 15. If the encoding mode 15 is intra prediction, a difference is calculated between an input video signal 3 and the predicted image of the intra prediction by the subtracter 16 to obtain a predicted residual signal 17a. If the encoding mode 15 is motion compensation prediction, a difference is calculated between the input video signal 3 and the predicted image of the motion compensation prediction by the subtracter 16 to obtain a predicted residual signal 17a.

The obtained predicted residual signal 17a is transformed or quantized by the C0 component predicted residual encoding unit 18, C1 component predicted residual encoding unit 19, and C2 component predicted residual encoding unit 20 to compress information. At the C1 component predicted residual encoding unit 19 and C2 component predicted residual encoding unit 20, a process for the C1/C2 component is switched according to the chroma format identification information 1 and the common encoding/independent encoding identification information 2.

Figure 11:
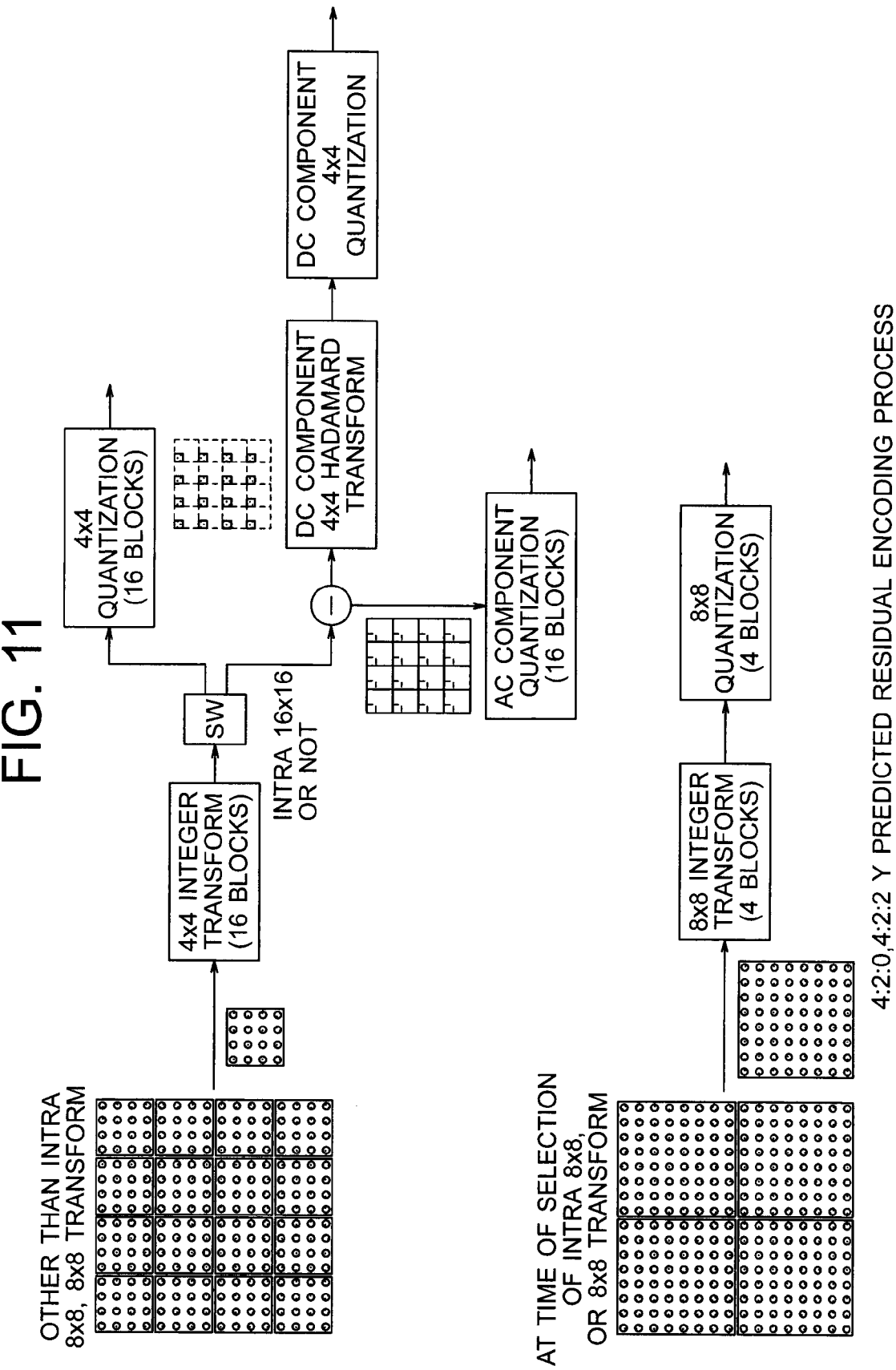
FIG. 11 are explanatory diagrams showing 4:2:0 and 4:2:2 Y predicted residual encoding processes.

For the Y component in the case of the chroma formats being 4:2:0 and 4:2:2, and the C0 component in the case of the chroma format being 4:4:4, predicted residual encoding processes of FIG. 11 are carried out by the C0 component predicted residual encoding unit 18. According to the process, first, if the encoding mode 15 is an intra 8×8 prediction mode, or a mode for subjecting the predicted residual signal 17a to integer transform by a 8×8 block unit is selected, integer transform is executed by units of 8×8 blocks where a macroblock is divided into four, and a quantization process is executed according to a quantization parameter 32 to obtain quantization coefficient data 21. If the encoding mode 15 is other than the above, integer transform is first executed by 4×4 block units. Subsequently, if the encoding mode 15 is an intra 16×16 prediction mode, only DC components of transform coefficients of 4×4 blocks are collected to constitute 4×4 blocks, and Hadamard transform is carried out. For the DC component, quantization is carried out for the Hadamard transform coefficient according to the quantization parameter 32, and quantization processes are individually carried out for 15 AC components of the remaining 4×4 blocks. If the encoding mode 15 is not an intra 16×16 prediction mode, a quantization process is simultaneously carried out for 16 transform coefficients according to the quantization parameter 32.

Figure 12:
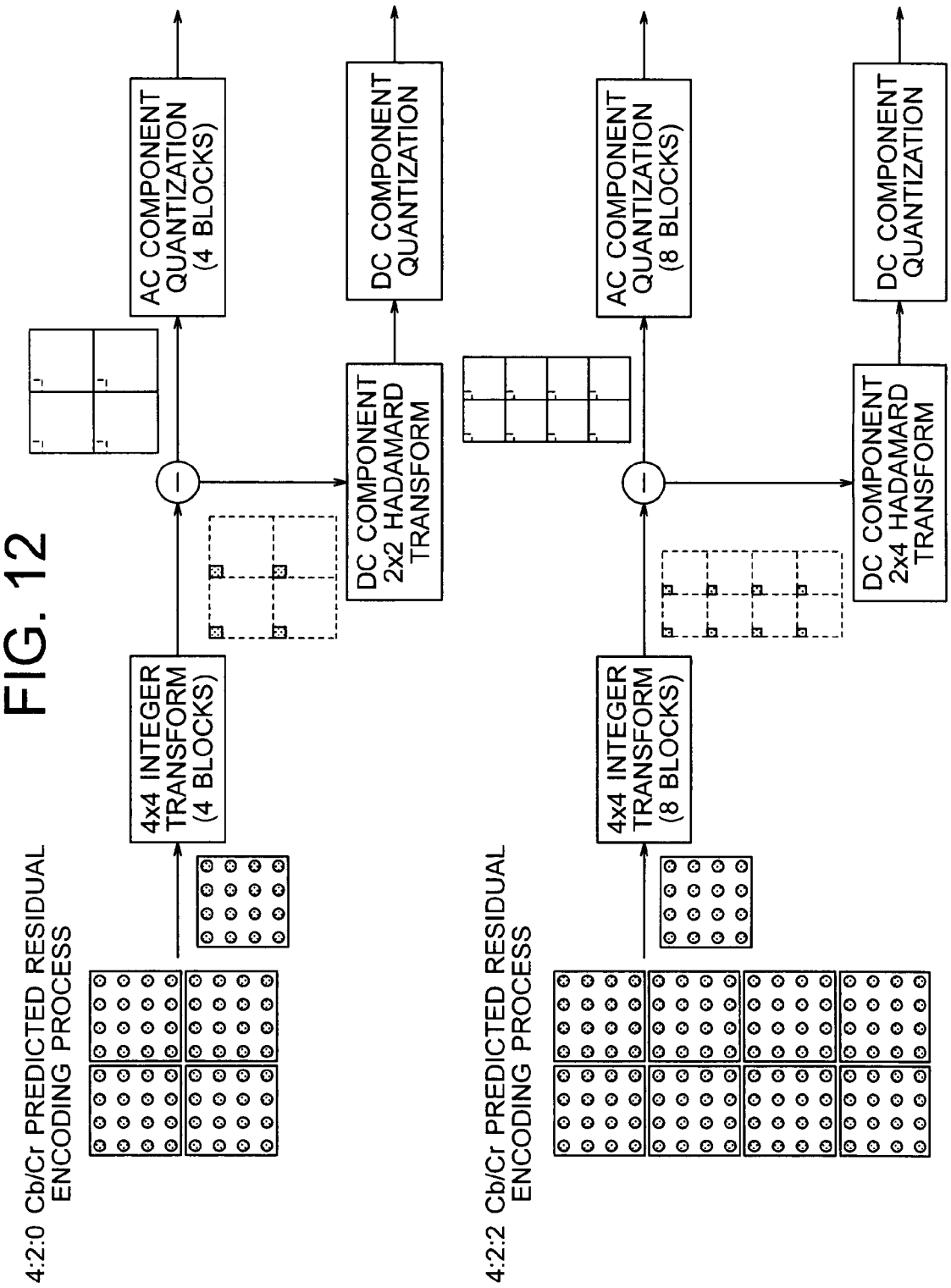
FIG. 12 are explanatory diagrams showing 4:2:0 and 4:2:2 Cb/Cr predicted residual encoding processes.

For the Cb component, in the case of the chroma formats being 4:2:0 and 4:2:2, and for the C1 component in the case of the chroma format being 4:4:4, a predicted residual encoding process is carried out by the C1 component predicted residual encoding unit 19. In this case, as predicted residual encoding is executed through the processes shown in FIG. 12 when the chroma formats are 4:2:0 and 4:2:2, and through the processes shown in FIG. 11 when the chroma format is 4:4:4, only the process in the case of the chroma formats being 4:2:0 and 4:2:2 will be described below. According to this process, without depending on the encoding mode 15, the Cb component signal of the macroblock is divided into 4×4 blocks to execute integer transform, and a quantization process is carried out according to the quantization parameter 32 to obtain quantized coefficient data 22. First, integer transform is carried out by 4×4 block units, and then DC components of the 4×4 blocks are collected to constitute 2×2 blocks (when the chroma format is 4:2:0) or 2×4 blocks (when the chroma format is 4:2:2), thereby carrying out Hadamard transform. For the DC component, quantization is executed for the Hadamard transform coefficient according to the quantization parameter 32, and a quantization process is carried out individually for 15 AC components of the remaining 4×4 blocks according to the quantization parameter 32.

For the Cr component in the case of the chroma formats being 4:2:0 and 4:2:2, and the C2 component in the case of the chroma format being 4:4:4, a predicted residual encoding process is carried out by the C2 component predicted residual encoding unit 20. In this case, predicted residual encoding is carried out through the processes shown in FIG. 12 when the chroma formats are 4:2:0 and 4:2:2, and through the processes shown in FIG. 11 when the chroma format is 4:4:4 to obtain quantized coefficient data 23 as an output.

For each color component, as a result of quantization, information of a coded block pattern (CBP) indicating whether there is a valid (nonzero) coefficient in 8×8 block units is defined, and multiplexed as one piece of information of a macroblock unit on a bit stream again. CBP definition is switched based on the chroma format identification information 1 and the common encoding/independent encoding identification information 2, and the details thereof will be described in the description of the decoding device.

Using the quantized coefficient data 21 to 23 obtained through the aforementioned process as inputs, local decoding predicted residual signals are obtained at the C0 component local decoding unit 24, C1 component local decoding unit 25, and C2 component local decoding unit 26. For these local decoding units, exactly the same members are used in the decoding device side. Thus, the detailed operations thereof will be described in the description of the decoding device side.

(4) Variable Length Encoding Process

As pieces of header information of a sequence level, the chroma format identification information 1, the common encoding/independent encoding identification information 2, the intra only encoding instruction information 4, and the image size information 31 are input to the variable length encoding unit 27. When the common encoding/independent encoding identification information 2 indicates "independent encoding process", color component identification information indicating which color component a picture currently under the encoding process belongs to is input, and a color component identification flag 33 is added to a slice head currently under the encoding process based on the information. Accordingly, in the decoding device side, which color component encoded data the received slice contains can be identified. As encoded data of a macroblock level, the encoding mode 15, the intra prediction mode 100/101, the motion information 102/103, the quantization parameter 32, the transformed block size instruction information 104, and the quantized coefficient data 21/22/23 are input, and subjected to entropy encoding by Huffman coding or arithmetic coding to be multiplexed on the bit stream 30. The bit stream 30 is formed into a packet by a slice data unit where one or a plurality of macroblocks are collected (also called NAL unitization in AVC) to be output.

Figure 13:
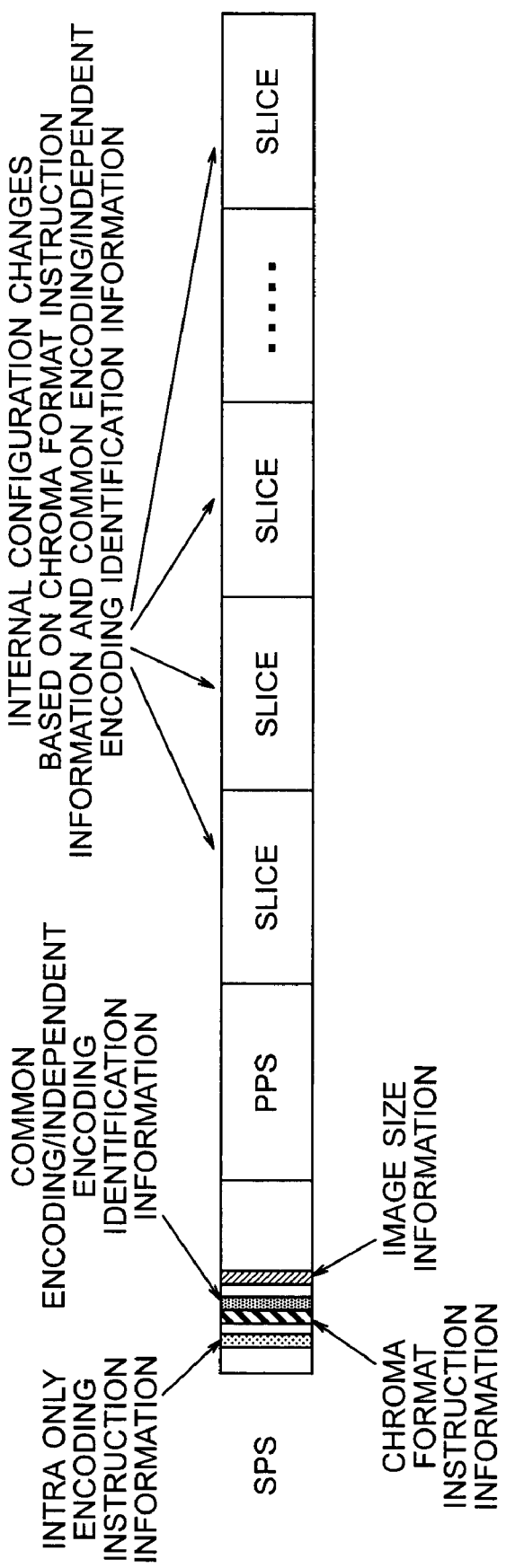
FIG. 13 is an explanatory diagram showing a bit stream.

FIG. 13 shows the entire bit stream 30. The chroma format identification information 1, the common encoding/independent encoding identification information 2, the intra only encoding instruction information 4, and the image size information 31 are multiplexed on a sequence parameter set (SPS) which is header information of the sequence level. As the common encoding/independent encoding identification information 2 is necessary only when the chroma format is 4:4:4, it is multiplexed only when the chroma format identification information 1 indicates 4:4:4. An initial value of the quantization parameter 32 used at a picture head is multiplexed on a picture parameter set (PPS) which is header information of the picture level. Image encoding data is multiplexed on a slice or smaller unit, and data formats vary as shown in FIGS. 14 and 15A and 15B according to values of the chroma format identification information 1 and the common encoding/independent encoding identification information 2.

Figure 14:
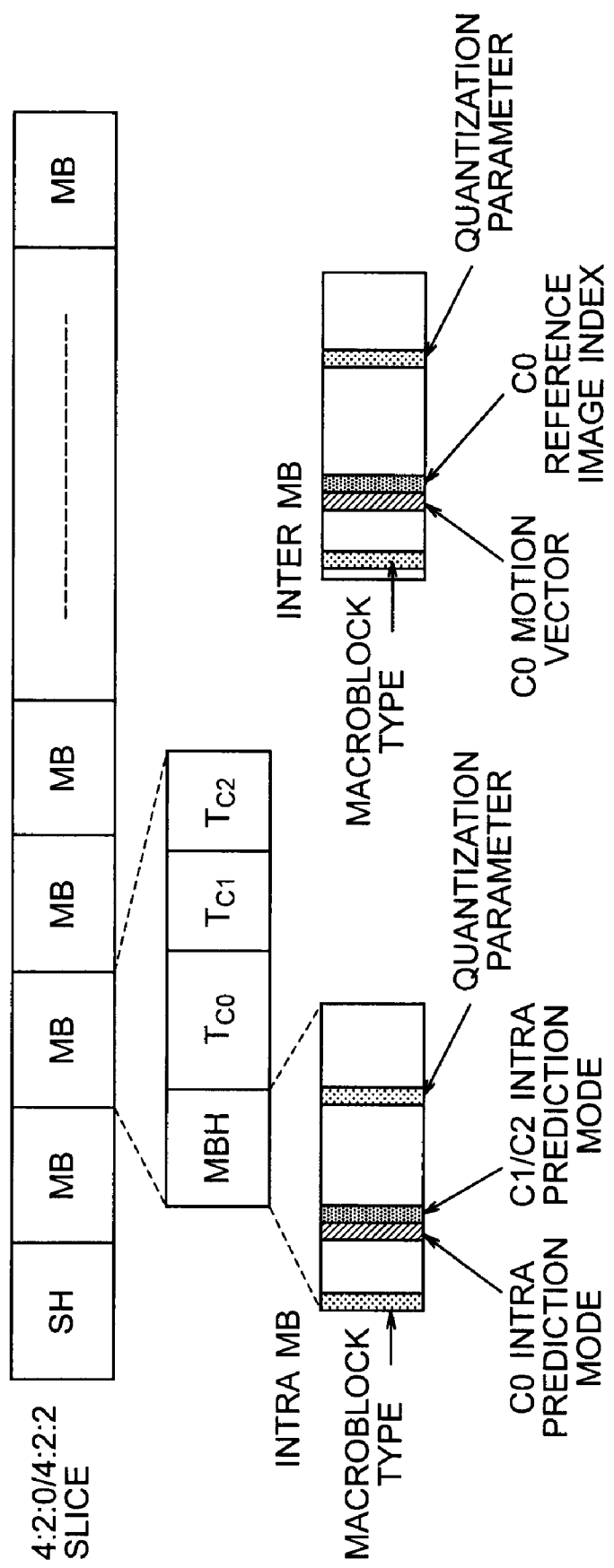
FIG. 14 is an explanatory diagram showing a slice structure.

When the chroma format identification information 1 indicates that chroma formats are 4:2:0 and 4:2:2, a slice structure shown in FIG. 14 is obtained. In FIG. 14, SH is a slice header, MB is macroblock encoding data, MBH is a macroblock header, and Tx is quantized coefficient data of an x component. In this case, in the configuration of FIG. 2, the slice contains encoding data of a macroblock constituted of Y, Cb and Cr pixels according to a chroma format sample ratio, the MBH contains a macroblock type equivalent to the encoding mode 15. If the macroblock type indicates an intra prediction mode, an intra prediction mode 100 of a C0, i.e., Y component, a common intra prediction mode 101 of C1 and C2, i.e., Cb and Cr components, and a quantization parameter 32 used for quantization/inverse quantization of quantized coefficient data are contained. If the macroblock type indicates a motion compensation prediction (inter) mode, motion information 102 (motion vector and reference image index) of C0, i.e., Y component, and the quantization parameter 32 used for quantization/inverse quantization of the quantized coefficient data are contained.

When the chroma format identification information 1 indicates that a chroma format is 4:4:4, a slice structure shown in each of FIGS. 15A and 15B is obtained according to a value of the common encoding/independent encoding identification information 2. If the common encoding/independent encoding identification information 2 indicates "common encoding process" (FIG. 15A), in the configuration of FIG. 2, the slice contains encoding data of a macroblock constituted of pixels of C0, C1 and C2 components according to a chroma format sample ratio, and the MBH contains a macroblock type equivalent to the encoding mode 15. If the macroblock type indicates an intra prediction mode, an intra prediction mode 100 common among all the C0, C1 and C2 components, and the quantization parameter 32 used for quantization/inverse quantization of the quantized coefficient data are contained. If the macroblock type indicates a motion prediction (inter) mode, motion information 102 (motion vector and reference image index) common among all the C0, C1 and C2 components, and the quantization parameter 32 used for quantization/inverse quantization of the quantized coefficient data are contained.

If the common encoding/independent encoding identification information 2 indicates "independent encoding process" (FIG. 15B), in the configuration of FIG. 3, the slice contains encoding data of a macroblock constituted of a pixel one color component (k) of C0, C1 and C2. As information indicating which of C0, C1 and C2 color components Ck is, a color component identification flag 33 is added to the head of the slice. The MBH contains a macroblock type equivalent to the encoding mode 15. If the macroblock type indicates an intra prediction mode, an intra prediction mode 100 of the Ck component, and the quantization parameter 32 used for quantization/inverse quantization of the quantized coefficient data are contained. If the macroblock type indicates a motion compensation prediction (inter) mode, motion information 102 (motion vector and reference image index) of the Ck component, and the quantization parameter 32 used for quantization/inverse quantization of the quantized coefficient data are contained.

Though not shown, if necessary, a unique word indicating a break of an access unit (one picture when the chroma formats are 4:2:0 and 4:2:2, or a common encoding process is executed, and three pictures when an independent encoding process is executed) may be inserted (access unit delimiter of AVC, picture start code in MPEG-2 Standard, or VOP start code in MPEG-4 Standard).

With the configuration of the bit stream, even when the plurality of different chroma formats such as 4:2:0, 4:2:2, and 4:4:4 are encoded en bloc, a method for detecting/generating an encoded prediction mode or motion information, and semantics of encoded data can be made common. Thus, the configuration of the encoding device can be made efficient. Further, as video encoded data of the plurality of different chroma formats such as 4:2:0, 4:2:2 and 4:4:4 can be represented by a bit stream of a single format, the bit stream 30 output from the encoding device of the first embodiment can satisfy high mutual connectability in a transmission/recording system for handling the plurality of different chroma formats.

The encoding device of FIG. 4 is configured to control an encoding process based on the intra only encoding instruction information 4. The intra only encoding instruction information 4 is a signal for instructing whether to execute a prediction process of a time direction based on motion compensation prediction by the encoding device. If the signal indicates "intra only encoding", encoding closed in the screen (encoding of only intra prediction) is carried out for all pictures of the input video signal 3 without executing prediction of a time direction based on motion compensation prediction. Simultaneously, a deblocking filter is made invalid in the picture encoding unit. If the intra only encoding instruction information 4 indicates "not intra only encoding", for the pictures of the input video signal 3, by also using prediction of a time direction based on motion compensation prediction, encoding using all correlations in the screen and between the screens is carried out. The intra only encoding instruction information 4 is added to the sequence parameter set to be multiplexed on the bit stream 30 by the variable length encoding unit 27. Accordingly, the decoding device that receives the bit stream 30 can recognize intra only encoding of the bit stream 30 by decoding the intra only encoding instruction information 4 of the sequence parameter set to check its value. Thus, if the intra only encoding has been operated, the calculation amount of the decoding device can be reduced without executing a deblocking filtering process. If the intra only encoding instruction information 4 indicates "intra only encoding", motion compensation prediction is not carried out, and thus no reference image is written in the frame memory 13. With this configuration, memory access is reduced.

The encoding device is further configured to control the encoding process based on screen size information 31 of the input video signal 3. The screen size information 31 indicates the number of macroblocks in the picture of the input video signal 3. If this value exceeds a predetermined threshold value, an upper limit is set in the number of macroblocks included in a slice, and control is executed not to include more macroblocks in the slice. Specifically, the screen size information 31 is input to the variable length encoding unit 27. The variable length encoding unit 27 sets an upper limit value for the number of macroblocks included in the slice, based on the screen size information 31. The variable length encoding unit 27 counts the number of encoded macroblocks beforehand, and closes a packet of slice data to form subsequent macroblocks into a packet as new slice data when the number of macroblocks included in the slice reaches the upper limit value. The screen size information 31 is added to the sequence parameter set to be multiplexed on the bit stream 30 by the variable encoding unit 27. Accordingly, when a screen size of the input video signal 3 is large (space resolution is high), the encoding device and the decoding device can both specify units to be processed in parallel, and carry out smooth task allocation.

Decoding Device

FIG. 16 shows a configuration of the decoding device according to the first embodiment. The decoding device of FIG. 16 is configured to receive the bit stream 30 and to switch an internal decoding process based on chroma format identification information 1 contained in the bit stream, and decodes encoded data of the plurality of different chroma formats.

The input bit stream 30 is first subjected to a variable length decoding process (variable length decoding unit 200), and the chroma format identification information 1, the common encoding/independent encoding identification information 2, the intra only encoding instruction information 4, and the screen size information 31 are decoded as pieces of high-order header information to be held during sequence decoding. Subsequently, each macroblock data is decoded based on the slice structures of FIGS. 14 and 15A and 15B defined by the chroma format identification information 1 and the common encoding/independent encoding identification information 2, and the macroblock structure of FIG. 2 or 3. In decoding of macroblock units, first, according to the decoded encoding mode 15, an intra predicted image generation process (C0 component intra predicted image generation unit 7 and C1/C2 component intra predicted image generation unit 8) and a motion compensation process (C0 component motion compensation unit 11 and C1/C2 component motion compensation unit 12) are carried out to generate a predicted image of the macroblock. A inverse quantization/inverse integer transform process is carried out for quantization coefficient data decoded as a part of macroblock encoded data to decode a predicted residual signal 17b (C0 component predicted residual decoding unit 24, C1 component predicted residual decoding unit 25, and C2 component predicted residual decoding unit 26). Then, the predicted image 34 and the predicted residual signal 17b are added together to obtain a temporary decoded image. If necessary, deblocking filtering (deblocking filter unit 28) is carried out to suppress block boundary distortion accompanying quantization, and then stored in a frame memory 201 and/or a line memory 202 to be used for subsequent predicted image generation processes. When the intra only encoding instruction information 4 indicates "execution of only intra encoding", only an intra predicted image generation process is carried out without executing a motion compensation process.

A variable length decoding process, an intra predicted image generation process, a motion compensation process, and a predicted residual decoding process switched based on the chroma format identification information 1, the common encoding/independent encoding identification information 2, and the intra only encoding instruction information 4 which are features of the first embodiment will be described in detail.

(1) Variable Length Decoding Process

The bit stream 30 is input to the variable length decoding unit 200, and a high-order header such as a sequence parameter set or a picture parameter set of FIG. 13 is analyzed. Through this process, the chroma format identification information 1, the common encoding/independent encoding identification information 2, the intra only encoding instruction information 4, and the image size information 31 are decoded. The common encoding/independent encoding identification information 2 is extracted from the bit stream 30 only when the chroma format identification information 1 indicates a chroma format being 4:4:4. These parameters are held in the internal memory of the variable length decoding unit 200 during sequence decoding.

Subsequently, a slice NAL unit is decoded. First, only when the chroma format identification information 1 indicates a chroma format being 4:4:4, and the common encoding/independent encoding identification information 2 indicates "independent encoding process", the color component identification flag 33 is decoded to recognize which color component encoded data a current slice contains. A slice header is subsequently decoded, and the process proceeds to decoding of macroblock encoded data belonging to the slice.

Figure 17:
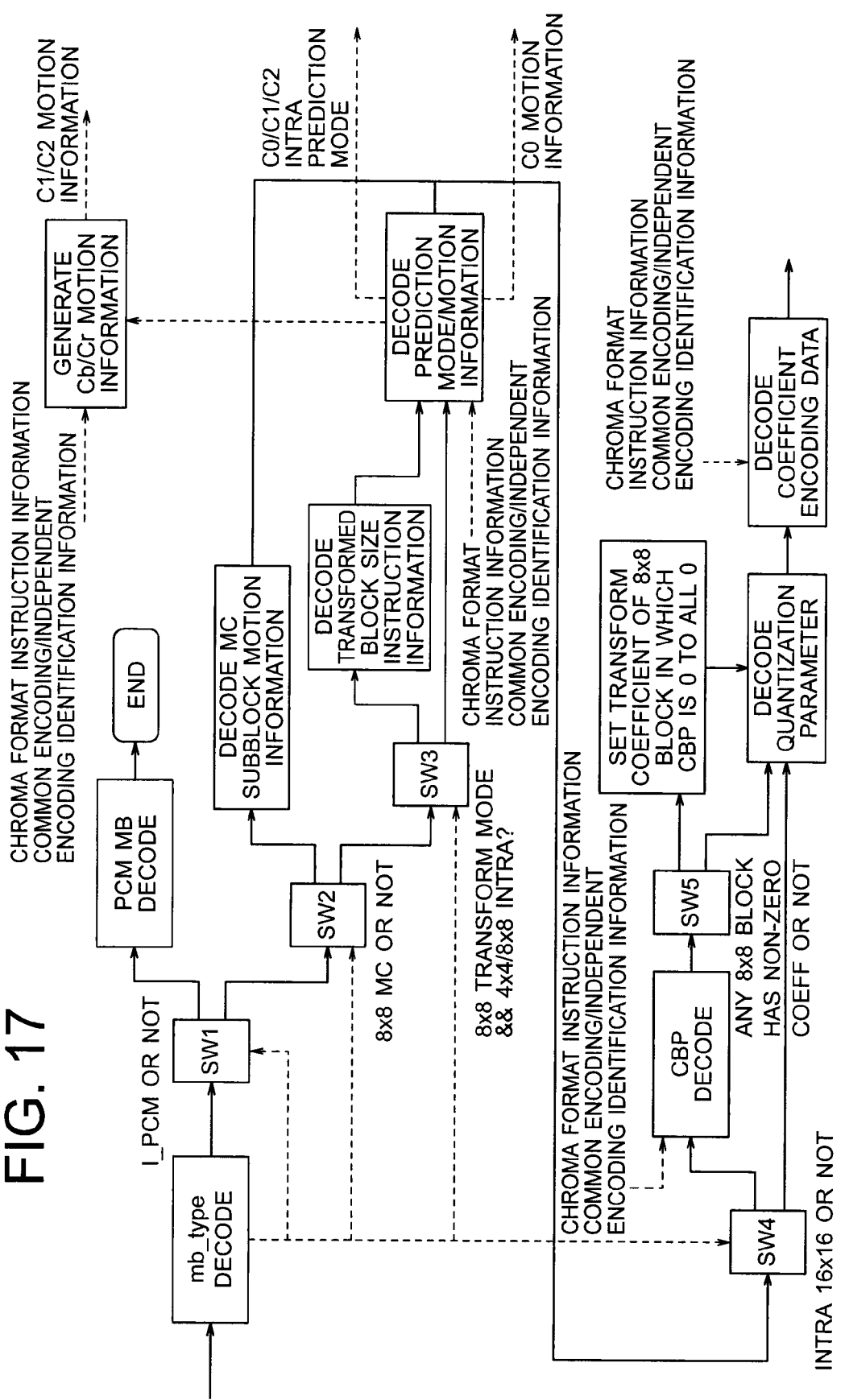
FIG. 17 is an explanatory diagram showing a macroblock layer internal process of a variable length decoding unit.

Referring to FIG. 17, an array of macroblock encoded data and a flow of its analyzing/decoding process will be described. Macroblock decoding is carried out as follows.

(a) First, as shown in FIGS. 14 and 15A and 15B, a macroblock type (mb_type of FIG. 17) equivalent to the encoding mode 15 is decoded.

(b) In SW1, mb_type is evaluated. If mb_type indicates a PCM mode (mode of directly multiplexing pixel value on bit stream without compression), uncompressed data equivalent to the number of pixels in the macroblock are extracted directly from the bit stream, and the decoding process of the macroblock is finished.

(c) In SW1, mb_type is not a PCM mode. In SW2, mb_type is evaluated to indicate a mode of executing motion compensation prediction based on a size equal to or less than 8×8 blocks, a sub macroblock type (sub_mb_type) equal to or less than 8×8 blocks is decoded, and motion information (motion vector/reference image index) of each sub block is decoded. To SW4.

(d) In SW2, mb_type does not satisfy the conditions of (c). In SW3, mb_type is evaluated. If 8×8 blocks can be selected as a transform block size of the predicted residual signal 17b in the inter encoding mode, transform block size instruction information 104 is decoded, and motion information is decoded. In the case of decoding the motion information, decoding is carried out as follows based on the chroma format identification information 1 and the common encoding/independent encoding identification information 2. To SW4.

(1) When a chroma format is 4:2:0 or 4:2:2, motion information to be decoded is decoded as C0 component motion information 102.

(2) When a chroma format is 4:4:4 and a process is a common encoding process, motion information to be decoded is decoded as pieces of motion information 102 and 103 used in common among C0, C1 and C2 components.

(3) When a chroma format is 4:4:4 and a process is an independent encoding process, motion information to be decoded is decoded as motion information used for a Ck component indicated by the color component identification flag 33.

(e) In SW2, mb_type does not satisfy the conditions of (c). In SW3, mb_type is evaluated. If a mode is an intra 4×4 or 8×8 prediction mode, intra prediction mode information is decoded. In the case of decoding the intra prediction mode information, decoding is carried out as follows based on the chroma format identification information 1 and the common encoding/independent encoding identification information 2. To SW4.

(1) When a chroma format is 4:2:0 or 4:2:2, a C0 component intra prediction mode 100 defined by a unit of 4×4 or 8×8 blocks is decoded for the Y component, and an independently encoded C1/C2 component intra prediction mode 101 is decoded for the Cb/Cr component.

(2) When a chroma format is 4:4:4 and a process is a common encoding process, intra prediction mode information to be decoded is decoded as pieces of intra prediction mode information 100 and 101 used in common among C0, C1 and C2 components.

(3) When a chroma format is 4:4:4 and a process is an independent encoding process, intra prediction mode information to be decoded is decoded as intra prediction mode information used for a Ck component indicated by the color component identification flag 33.

(f) In SW3, mb_type does not satisfy the conditions of (d) or (e). In SW4, mb_type is evaluated. If a mode is an intra 16×16 prediction mode, the intra 16×16 prediction mode incorporated in mb_type is decoded. Then, if the chroma format identification information 1 indicates a chroma format being 4:2:0 or 4:2:2, according to (1) of (e), the C1/C2 component intra prediction mode 101 independent of the Y component is decoded. Then, a quantization parameter is decoded.

(g) If mb_type does not satisfy the conditions of (f) in SW4, a coded block pattern (CBP) is decoded. Based on a value of the CBP, decoding results of quantized coefficient data are all set to 0 for 8×8 blocks indicating that all coefficients are 0. If the CBP indicates that there is a valid coefficient in one of 8×8 blocks in the macroblock (SW5), the quantization parameter is decoded. If the chroma format identification 1 indicates a chroma format being 4:2:0 or 4:2:2, the CBP to be decoded is decoded as information for judging presence of valid coefficient data for four 8×8 blocks of luminance components and 8×8 blocks of N (N=2 for 4:2; 0, N=4 for 4:2:2) chrominance components. If the chroma format identification information 1 indicates a chroma format being 4:4:4, and if the common encoding/independent encoding identification information 2 indicates "common encoding", the CBP is decoded as information for defining whether there is a valid coefficient in one of 8×8 blocks in the same space of C0, C1 and C2 for the four 8×8 blocks. If the common encoding/independent encoding identification information 2 indicates "independent encoding", the CBP is decoded for each component of C0, C1, and C2 as information of the same definition as that of the luminance component when the chroma format is 4:2:0 or 4:2:2.

(h) The quantized coefficient data is decoded for the macroblock whose quantization parameter has been decoded. In this case, the quantized coefficient data Tx is decoded according to the slice and macroblock data structures of FIGS. 14 and 15A and 15B defined based on the chroma format identification information 1 and the common encoding/independent encoding identification information 2.

(2) Intra Predicted Image Generation Process

The intra predicted image generation process is carried out by the C0 component intra predicted image generation unit 7 and the C1/C2 component intra predicted image generation unit 8 of FIG. 16. These units are common to those of the encoding device of FIG. 4.

In the case of the chroma formats of 4:2:0 and 4:2:2, for a signal of a Y component, a predicted image is generated based on a C0 component intra prediction mode 100 supplied from the variable length decoding unit 200 by the C0 component intra predicted image generation unit 7. For the C0 component intra prediction mode 100, there are three selectable types of modes, an intra 4×4 prediction mode, an intra 8×8 prediction mode, and an intra 16×16 prediction mode. For the intra 4×4 prediction mode and the intra 8×8 prediction mode, a macroblock is divided into blocks of 4×4 pixels or 8×8 pixels, and space prediction using a near reference pixel is carried out for each block as shown in FIG. 5 to form a predicted image. This predicted image generation method has nine options. Which of the nine methods is used to generate a predicted image is supplied as the C0 component intra prediction mode 100 to the C0 component intra predicted image generation unit 7. FIG. 5 show an example of 4×4 block. For an 8×8 pixel block, a similar mode is defined. Effects of the space prediction method having such directivity are as described above.

There is an intra 16×16 prediction mode as a mode of executing intra prediction at a 16×16 block not subdivided into any macroblocks (FIG. 6). In this case, the predicted image generation method is selected from four types of space prediction methods shown in FIG. 6. Effects of this space prediction mode are as described above.

Figure 18:
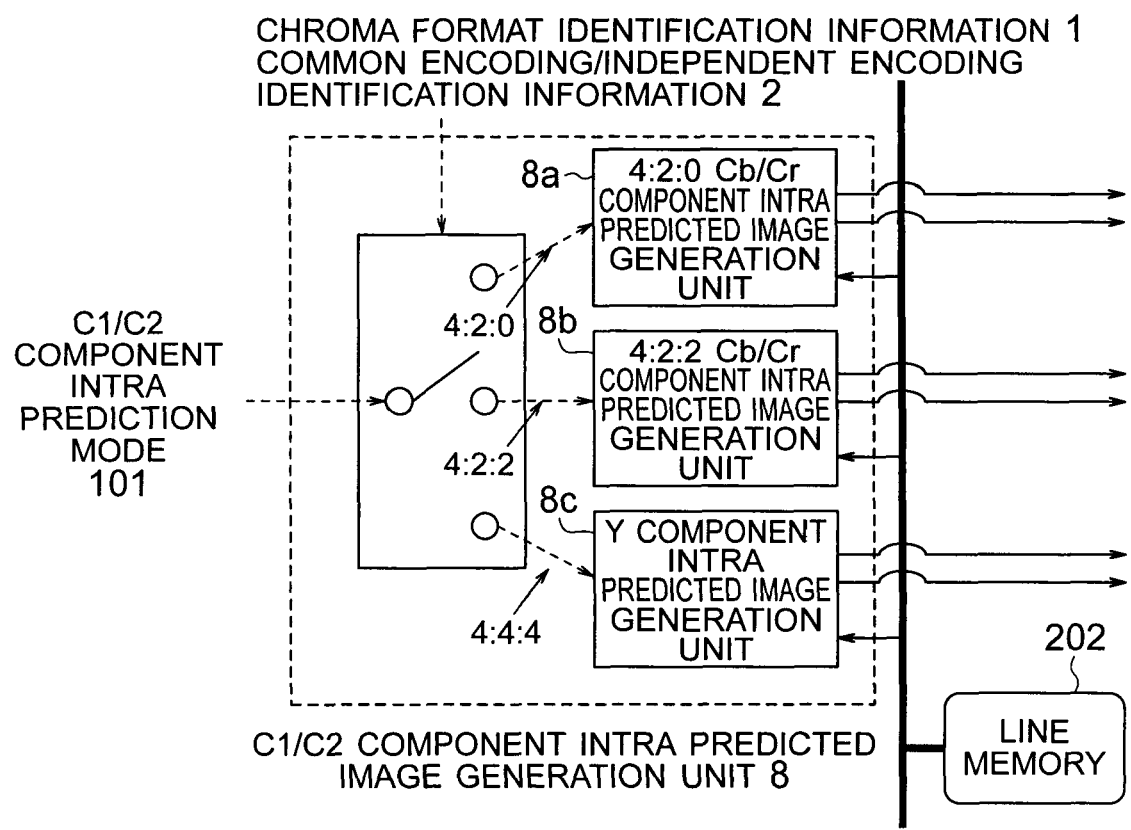
FIG. 18 is an explanatory diagram showing switching of intra prediction according to a chroma format in a Cb/Cr component.

For Cb and Cr components, by the C1/C2 component intra predicted image generation unit 8, an intra predicted image is generated independent of the Y component. FIG. 18 shows an internal configuration of the C1/C2 component intra predicted image generation unit 8 of the first embodiment. If the chroma format identification information 1 indicates a chroma format being 4:2:0 or 4:2:2, the C1/C2 component intra prediction mode 101 indicates one of four types of modes shown in FIG. 7. Based on the number of blocks of a predicted image generation target, the process branches to a 4:2:0 Cb/Cr component intra predicted image generation unit 8*a* or a 4:2:2 Cb/Cr component intra predicted image generation unit 8*b* according to a chroma format. In the case of the chroma format being 4:4:4, as the C1/C2 component intra prediction mode 101 has exactly the same definition that of the C0 component intra prediction mode for processing the Y component, the process branches to a Y component intra predicted image generation unit 8*c*. The Y component intra predicted image generation unit 8*c* can be configured by using substantially the same members as those of the C0 component intra predicted image generation unit 7. However, a difference is that predicted image generation is carried out for both C1 and C2 components if the common encoding/independent encoding identification information 2 indicates "common encoding process", and predicted image generation is carried out only for an intra prediction mode (101*a* or 101*b*) corresponding to the Ck component indicated by the color component identification flag 33 in the case of "independent encoding process".

In all the intra predicted image generation processes, a peripheral pixel value which becomes a reference pixel has to be a decoded image not subjected to deblocking filtering. Thus, a pixel value before a deblocking filtering process obtained by adding together a decoded predicted residual signal 17*b* which is an output of each of the C0 component predicted residual decoding unit 24, C1 component predicted residual decoding unit 25, and C2 component predicted residual decoding unit 26 and a predicted image 34 is stored in the line memory 202 to be used for intra predicted image generation.

(3) Motion Compensation Process

The motion compensation process is carried out by the C0 component motion compensation unit 11 and the C1/C2 component motion compensation unit 12 of FIG. 16. These units are common to those of the encoding device of FIG. 4.

In the case of the chroma formats being 4:2:0 and 4:2:2, a signal of a Y component is generated by the C0 component motion compensation unit 11 based on Y component motion information 102 decoded as a part of macroblock encoded data. The motion information contains a reference image index indicating which reference image among one or more reference image data stored in the frame memory 201 is used, and a motion vector applied to the reference imaged designated by the reference image index.

The Y component motion information 102 is decoded corresponding to seven types of block sizes which become motion compensation prediction units shown in FIGS. 8A to 8H. Which one of the block sizes of FIGS. 8A to 8H are used to execute motion compensation is decided by the encoding mode 15 and the sub macroblock type (sub_mb_type) described in the description of the variable length decoding process. The Y component motion information 102 is allocated to a block which becomes a unit of motion compensation, and a motion vector is applied to the reference image indicated by the reference image index of the frame memory 201 to obtain a predicted image. For the Cb and Cr components, as shown in FIG. 17, in the variable length decoding unit 200, the same reference image index as that of the Y component is allocated and the motion vector of the Y component is used to obtain Cb/Cr component motion information 103 (specifically, obtained by scaling the motion vector of the Y component at a sampling ratio of Y, Cb and Cr).

As described above referring to FIGS. 9 and 10, a method for generating a predicted image at the motion compensation unit varies between the Y component and the Cb/Cr component. A motion compensation process of the Cb/Cr component is carried out by the C1/C2 component motion compensation unit 12.

Figure 19:
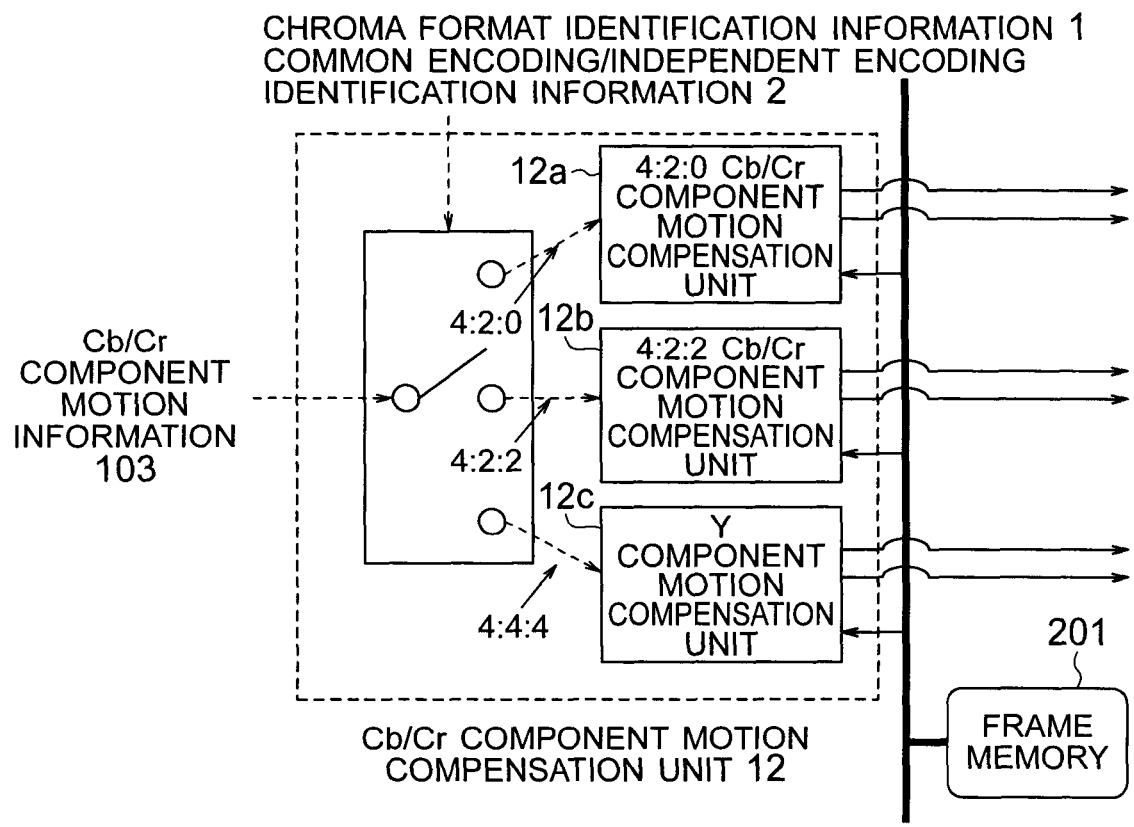
FIG. 19 is an explanatory diagram showing switching of MC according to a chroma format in a Cb/Cr component.

FIG. 19 shows an internal configuration of the C1/C2 component motion compensation unit 12 of the first embodiment. If the chroma format identification information 1 indicates a chroma format being 4:2:0 or 4:2:2, Cb/Cr component motion information 103 is generated by the variable length decoding unit 200 based on the C0 component, i.e., Y component motion information 102 as described above to be input to the C1/C2 motion compensation unit 12. Based on the number of blocks of a predicted image generation target, the process branches to a 4:2:0 Cb/Cr component motion compensation unit 12*a* or a 4:2:2 Cb/Cr component motion compensation 12*b* according to a chroma format. In the case of the chroma format 4:4:4, as the Cb/Cr component motion compensation information 103 has exactly the same definition as that of the Y component motion compensation information 102 for processing the Y component, the process branches to a Y component motion compensation unit 12*c*. The Y component motion compensation unit 12*c* can be configured by using substantially the same members as those of the C0 component motion compensation unit 11. However, a difference is that predicted image generation is carried out for both C1 and C2 components if the common encoding/independent encoding identification information 2 indicates "common encoding process", and predicted image generation is carried out only for motion information (103*a* or 103*b*) corresponding to the Ck component indicated by the color component identification flag 33 in the case of "independent encoding process".

(4) Predicted Residual Decoding Process

The predicted residual decoding process is carried out by the C0 component predicted residual decoding unit 24, C1 component predicted residual decoding unit 25, and C2 component predicted residual decoding unit 26 of FIG. 16. These are common to the C0 component local decoding unit 24, C1 component local decoding unit 25, and C2 component local decoding unit 26 of the encoding device of FIG. 4.

The predicted residual decoding process is a process for restoring a predicted residual signal 17*b* by executing inverse quantization/inverse transform for C0 to C2 component quantized coefficient data 21 to 23 for each macroblock output from the variable length decoding unit 200. At the C1 component predicted residual decoding unit 25 and C2 component predicted residual decoding unit 26, a process for the C1/C2 component is switched according to the chroma format identification information 1 and the common encoding/independent encoding identification information 2.

Figure 20:
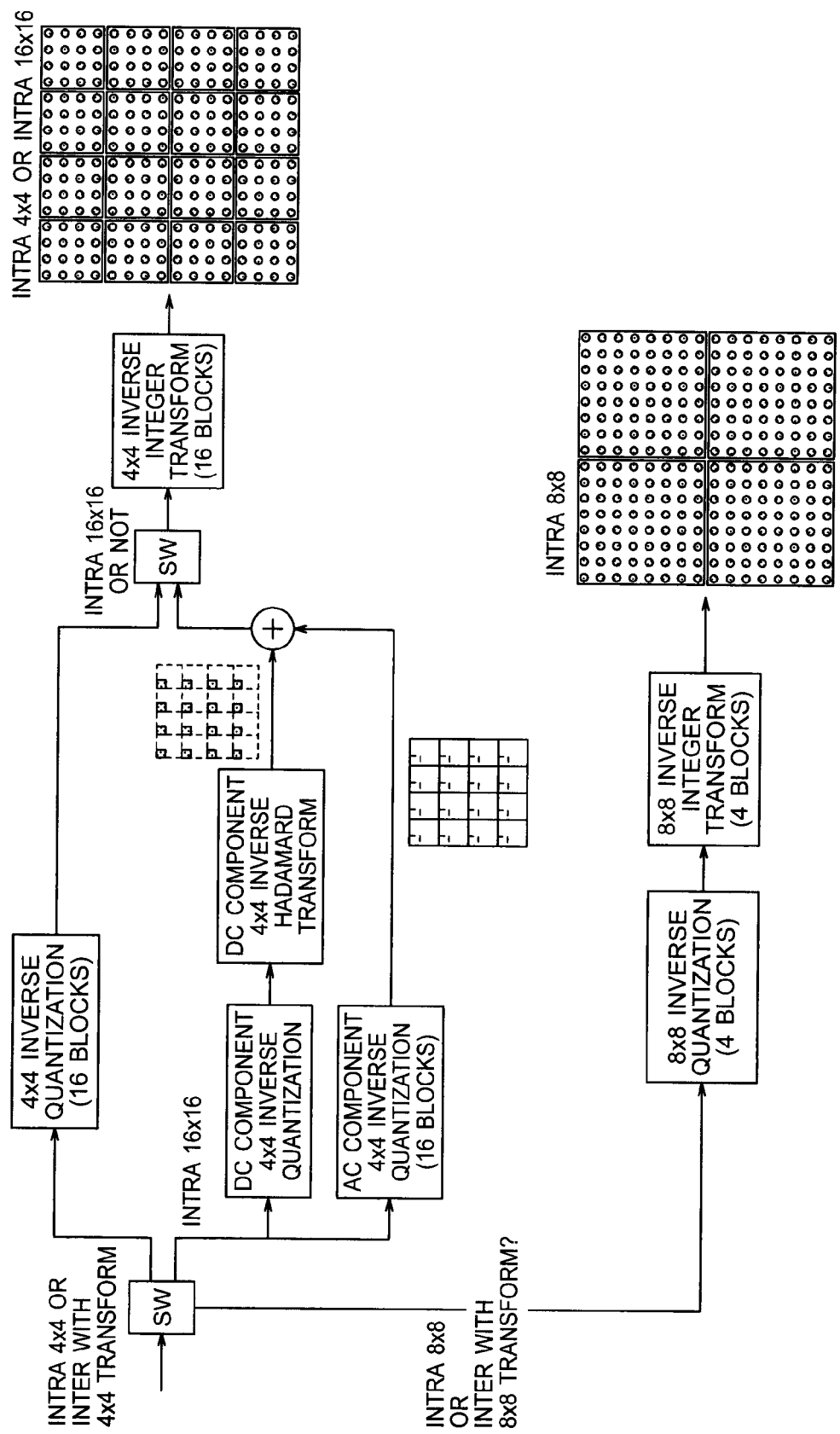
FIG. 20 is an explanatory diagram showing a 4:2:0, 4:2:2 Y, 4:4:4 predicted residual decoding process.

For the Y component in the case of the chroma formats being 4:2:0 and 4:2:2, and the C0 component in the case of the chroma format being 4:4:4, a predicted residual decoding process of FIG. 20 is carried out by the C0 component predicted residual decoding unit 24. According to the process, first, if the encoding mode 15 is an intra 8×8 prediction mode, or transformed block size instruction information 104 indicates integer transform by a 8×8 block unit, quantized coefficient data 21 is processed by a unit of 8×8 blocks where a macroblock is divided into four. After a inverse quantization process is executed according to a quantization parameter 32 by an 8×8 block unit, inverse integer transform is executed by a unit of 8×8 blocks to obtain a restore value 17*b* of a predicted residual signal 17*a*.

If the encoding mode 15 is other than the above, the process is switched based on whether the encoding mode 15 is an intra 16×16 prediction mode. In the case of the intra 16×16 prediction mode, a inverse quantization process is first carried out for a transform coefficient of only DC components of transform coefficients of 4×4 blocks from the quantized coefficient data 21 according to the quantization parameter 32, and subsequently inverse Hadamard transform of 4×4 is carried out. Accordingly, a restore value of a DC component of the 4×4 blocks of the macroblock is obtained. A inverse quantization is also carried out for remaining 15 AC coefficients according to the quantization parameter 32, and a inverse quantized coefficient of a unit of 4×4 blocks can be obtained when combined with the obtained DC component. Lastly, by subjecting this to 4×4 inverse integer transform, a predicted residual signal 17*b* is restored.

If the encoding mode 15 is not an intra 16×16 prediction mode, inverse quantization/inverse integer transform is carried out for each 4×4 block to restore a predicted residual signal 17*b*.

For the Cb and Cr components in the case of the chroma formats being 4:2:0 and 4:2:2, and for the C1 and C2 components in the case of the chroma format being 4:4:4, predicted residual decoding processes are carried out at the C1 component predicted residual decoding unit 25 and C2 component predicted residual decoding unit 26.

Figure 21:
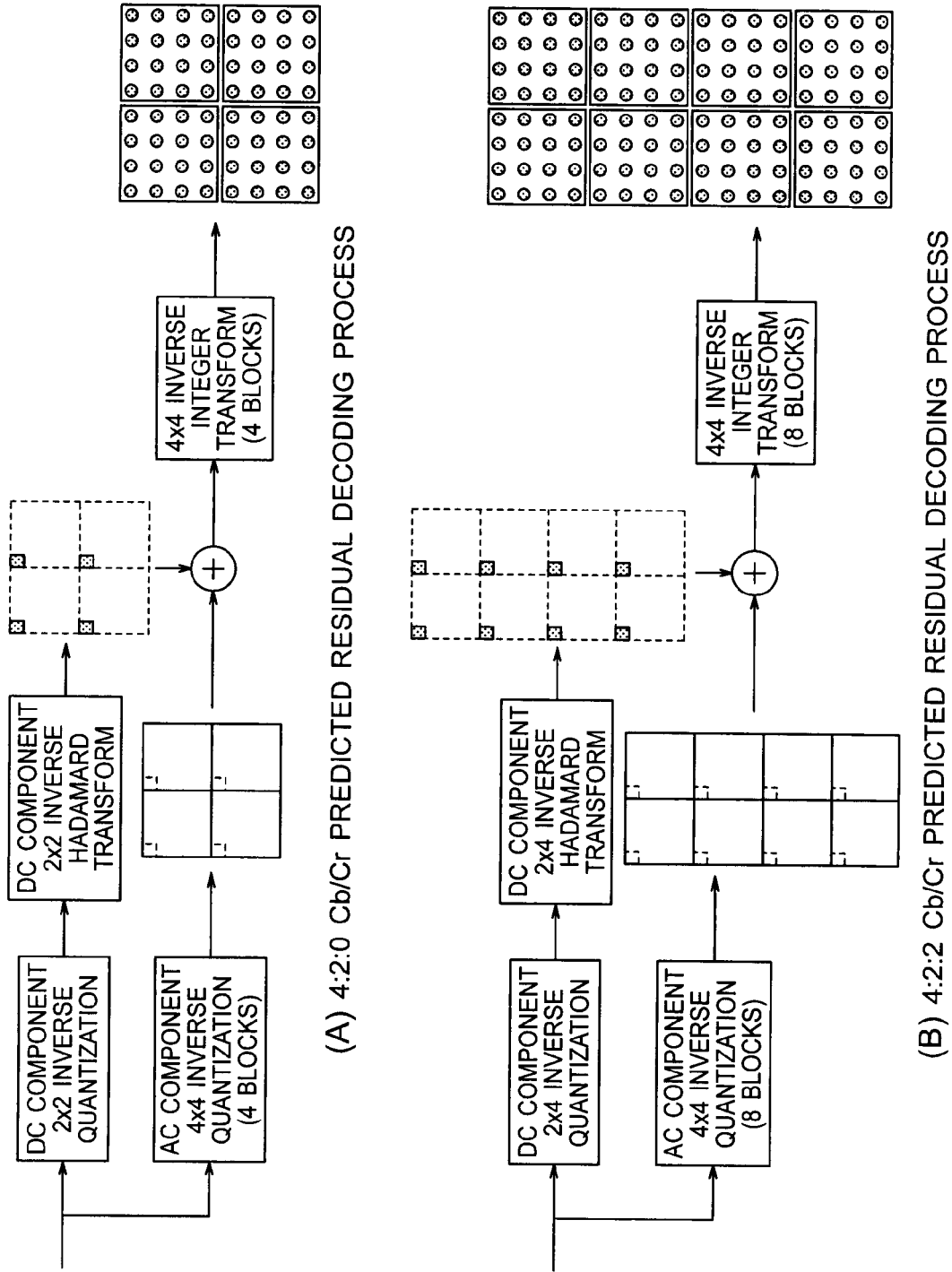
FIGS. 21A and 21B are explanatory diagrams showing 4:2:0 and 4:2:2 Cb/Cr predicted residual decoding processes.

For the Cb and Cr components in the case of the chroma formats being 4:2:0 and 4:2:2, a predicted residual decoding process is carried out based on a flow of FIGS. 21A and 21B. A difference between 4:2:0 and 4:2:2 is that which of 2×2 blocks and 2×4 blocks a unit for executing Hadamard transform is. First, only DC components of the transform coefficient of the 4×4 blocks are collected to constitute a block to be subjected to inverse Hadamard transform, and inverse Hadamard transform is executed after inverse quantization. For remaining 15 AC components, inverse quantization is individually carried out, and 4×4 inverse integer transform is executed after combination with the DC components. Thus, a predicted residual signal 17*b* is restored.

Figure 22:
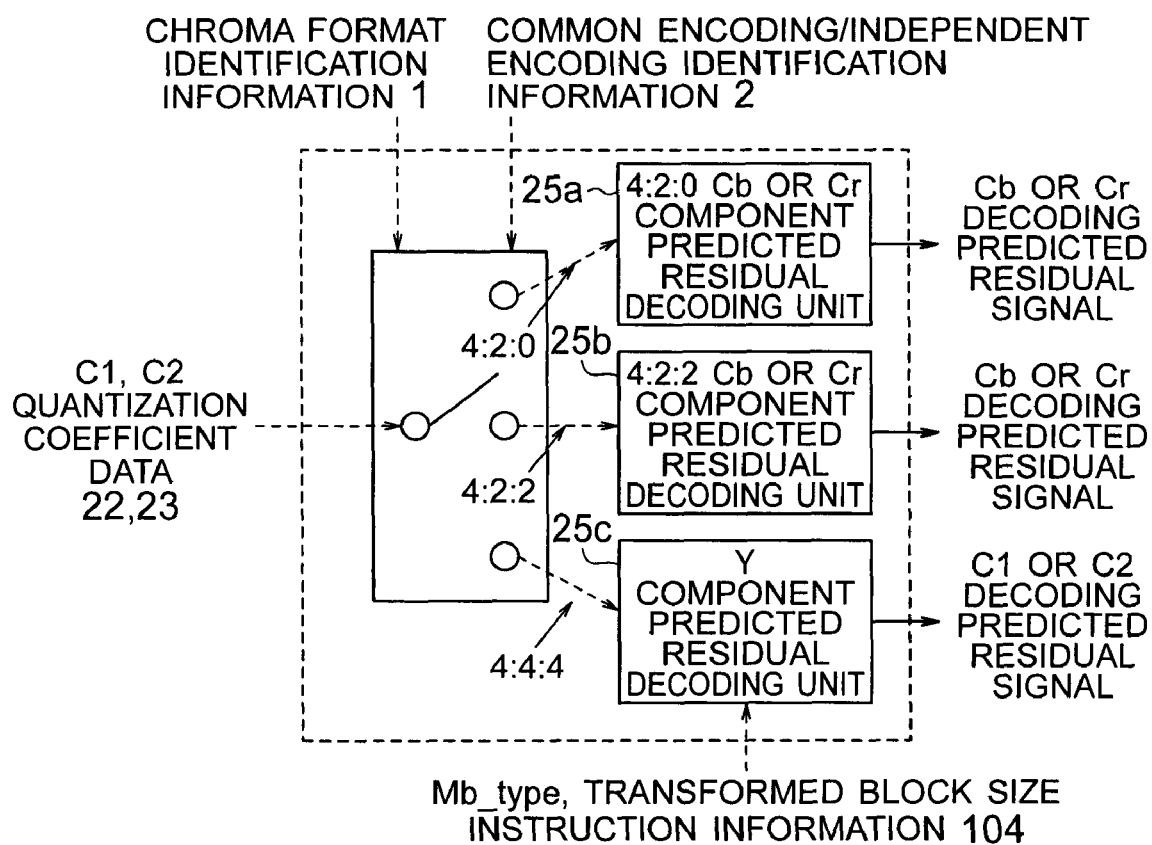
FIG. 22 is an explanatory diagram showing an internal configuration of a predicted residual decoding unit of C1 and C2 components.

FIG. 22 shows internal configurations of the C1 component predicted residual decoding unit 25 and C2 component predicted residual decoding unit 26. Processes for the Cb and Cr components in the case of the chroma formats being 4:2:0 and 4:2:2 are separately described in FIG. 22 as the 4:2:0 Cb or Cr component predicted residual decoding unit 25*a* and the 4:2:2 Cb or Cr component predicted residual decoding unit 25*b*, but a difference in processing contents is as described above. In the case of the chroma format being 4:4:4, as the C1/C2 quantized coefficient data 22 and 23 are encoded by exactly the same method as that for the 4:2:0 and 4:2:2 Y component quantized coefficient data 21, the process branches to the Y component predicted residual decoding unit 25*c*. The Y component predicted residual decoding unit 25*c* can be configured by using the same member as that of the C0 component predicted residual decoding unit 24.

If the intra only encoding instruction information 4 indicates "intra only encoding", the pictures of the bit stream 30 are all encoded by executing closed encoding (encoding of only intra prediction) in the screen without executing prediction of a time direction based on motion compensation prediction. Thus, a process of the deblocking filter unit 28 is made invalid. Accordingly, in the decoding device which receives the bit stream 30, the deblocking filter process is not executed in the case of intra only encoding, and thus a calculation amount of the decoding device can be reduced. Further, if the intra only encoding instruction information 4 indicates "intra only encoding", as no motion compensation prediction is executed, no reference image is written in the frame memory 201. With this configuration, memory access is reduced.

The decoding device of the first embodiment has been described by way of configuration where decoding is carried out upon reception of the bit stream 30 output from the encoding device. However, as long as the encoding device outputs a bit stream according to the form of the bit stream 30, bit streams output from an encoding device which executes encoding by using only the 4:2:0 chroma format as an input, or encoding devices of various specifications using only the 4:2:2 chroma format or two chroma formats of 4:2:0 and 4:2:2 can be correctly decoded.

According to the encoding and decoding devices of the first embodiment, for the plurality of different chroma formats such as 4:2:0, 4:2:2, and 4:4:4, encoding and decoding can be carried out in a unified manner through efficient device configuration, and mutual connectability of the video encoded data can be increased.

The first embodiment has been described by way of the case where the three color spaces of the 4:2:0 and 4:2:2 chroma formats are Y, Cb and Cr. However, by using other color spaces such as Y, Pb and Pr, the same effects can be obtained.

What is claimed is:

1. A moving image decoding device for decoding a digital moving image signal, based on an input of a bit stream generated by subjecting the digital moving image signal to compression encoding in which the digital moving image signal is transformed and quantized on a block basis, the moving image decoding device comprising:

a decoding unit for decoding chroma format identification information for designating a chroma format of an input video signal to be encoded, common encoding or independent encoding identification information indicating which of encoding through a common encoding process and encoding through an independent encoding process is to be executed, and intra only encoding instruction information indicating whether or not to intra encode all pictures corresponding to the digital moving image signal, wherein the decoding unit generates a decoded image in which a deblocking filter provided at each boundary between blocks serving as units of the transform and quantization is disabled when the intra only encoding instruction information indicates that all the pictures corresponding to the digital moving image signal are to be intra encoded;

the decoding unit decodes using an intra prediction mode which is different regarding luminance components and chrominance components when the chroma formats are 4:2:0 and 4:2:2 based on chroma format identification information;

the decoding unit decodes using an intra prediction image of each color component generated based on a unique intra prediction mode common to all the color components when the chroma format is 4:4:4 and the common encoding or independent encoding identification information indicates common encoding processing; and the decoding unit decodes using an intra prediction image of each color component generated based on an individual intra prediction mode for each color component when the chroma format is 4:4:4 and the common encoding or independent encoding identification information indicates independent encoding processing.

2. A moving image decoding method for decoding a digital moving image signal, based on an input of a bit stream generated by subjecting the digital moving image signal to compression encoding in which the digital moving image signal is transformed and quantized on a block basis, the moving image decoding method comprising:

a decoding step for decoding chroma format identification information for designating a chrome format of an input video signal to be encoded, common encoding or independent encoding identification information indicating which of encoding through a common encoding process and encoding through an independent encoding process is to be executed, and intra only encoding instruction information indicating whether or not to intra encode all pictures corresponding to the digital moving image signal, wherein the decoding step generates a decoded image in which a deblocking filter provided at each boundary between blocks serving as units of the transform and quantization is when the intra only encoding instruction information indicates that all the pictures corresponding to the digital moving image signal are to be intra encoded;

the decoding step decodes using an intra prediction mode which is different regarding luminance components and chrominance when the chrome formats are 4:2:0 and 4:2:2 based on chrome format identification information;

the decoding step decodes using an intra prediction image of each color component generated based on a unique intra prediction mode common to all the color components when the chrome format is 4:4:4 and the common encoding or independent encoding identification information indicates common encoding processing; and the decoding step decodes using an intra prediction image of each color component generated based on an individual intra prediction mode for each dolor component when the chrome format is 4:4:4 and the common encoding or independent encoding identification information indicates independent encoding processing.

* * * * *